US00RE42859E

(19) United States
(12) Reissued Patent
Tomida et al.

(10) Patent Number: US RE42,859 E
(45) Date of Reissued Patent: Oct. 18, 2011

(54) FILE SERVER THAT ALLOWS AN END USER TO SPECIFY STORAGE CHARACTERISTICS WITH EASE

(75) Inventors: Takahiko Tomida, Yokohama (JP); Yuki Sugimoto, Sagamihara (JP); Hideo Takahashi, Yokohama (JP); Hodaka Furuya, Yokohama (JP)

(73) Assignee: Hitachi, Ltd., Tokyo (JP)

(21) Appl. No.: 12/662,439

(22) Filed: Apr. 16, 2010

Related U.S. Patent Documents

Reissue of:
(64) Patent No.: 7,689,603
Issued: Mar. 30, 2010
Appl. No.: 11/675,227
PCT Filed: Feb. 15, 2007

(30) Foreign Application Priority Data

Dec. 7, 2006 (JP) ..... P2006-330594

(51) Int. Cl.
*G06F 7/00* (2006.01)

(52) U.S. Cl. ..... 707/828

(58) Field of Classification Search ..... 707/828, 707/999.205

See application file for complete search history.

(56) References Cited

U.S. PATENT DOCUMENTS

2007/0220071 A1* 9/2007 Anzai et al. ..... 707/204

OTHER PUBLICATIONS

Jay Ts, Robert Eckstein and David Collier-Brown, Using Samba, (U.S.) 2nd ed. (Sebastopol, CA: O'Reilly and Associates Inc., Feb. 2003), p. 1-3.
Jon William Toigo, The Holy Grail of Network Storage management (Indianapolis: Prentice Hall Professional Technical Reference, Oct. 2003), p. 61-67.
Ivan Ristic, Apache Security (Sebastopol, CA: O'Reilly and Associates Inc., May 2005), p. 137-139).

* cited by examiner

*Primary Examiner* — Tony Mahmoudi
*Assistant Examiner* — Jensen Hu
(74) *Attorney, Agent, or Firm* — Antonelli, Terry, Stout & Kraus, LLP.

(57) ABSTRACT

A file server device is provided which has less chance of error in changing directory settings information. A file server device that has access to a client computer and a disk array device receives a directory settings file, and writes the directory settings file in a specified shared directory. The file server device chooses, as a migration destination candidate, a volume whose settings information matches new settings information of the shared directory which is set as specified in the directory settings file. The file server device migrates information in the shared directory whose settings information is changed to the volume chosen as a migration destination candidate.

16 Claims, 16 Drawing Sheets

530

SHARED DIRECTORY ADDRESS TRANSLATION TABLE

| 531 LOGICAL SHARED DIRECTORY ADDRESS PATH NAME | 532 PHYSICAL SHARED DIRECTORY ADDRESS |
|---|---|
| /mail | nas1:/mail |
| /rdb | nas2:/rdb |
| /webcontents | nas2:/webcontens |
| ... | ... |

FIG. 7

520

VOLUME SETTINGS INFORMATION MANAGEMENT TABLE

| 521 VOLUME ID | 522 RAID TYPE | 523 HARD DISK DRIVE DEVICE PERFORMANCE |
|---|---|---|
| vol3 | 5 | INTERMEDIATE |
| vol7 | 1 | HIGH |
| ... | ... | ... |

FIG. 8

510

SHARED DIRECTORY ADDRESS SETTINGS INFORMATION MANAGEMENT TABLE

| 511 SHARED DIRECTORY ADDRESS PATH NAME | 512 SHARED DIRECTORY INTERNAL PATH NAME |
|---|---|
| /mail | /fs2/mail |
| /rdb | /fs3/rdb |
| ... | ... |

FIG. 9

500

STORAGE CHARACTERISTICS INFORMATION MANAGEMENT TABLE

| 501 FILE SERVER DEVICE NAME | 502 INTERNAL PATH NAME | 503 VOLUME ID | 504 RAID TYPE | 505 HARD DISK DRIVE DEVICE PERFORMANCE |
|---|---|---|---|---|
| nas1 | /fs3 | vol3 | 5 | INTERMEDIATE |
| nas2 | /fs7 | vol7 | 1 | HIGH |
| ... | ... | ... | ... | ... |

FIG. 10

DIRECTORY SETTINGS FILE raidtype: 5
diskspec: INTERMEDIATE

200a nas.conf

SHARED DIRECTORY ADDRESS TRANSLATION TABLE

| LOGICAL SHARED DIRECTORY ADDRESS PATH NAME | PHYSICAL SHARED DIRECTORY ADDRESS |
|---|---|
| /rdb | nas1:/rdb |
| /webcontents | nas2:/webcontens |

530a

BEFORE SETTINGS CHANGE

STORAGE CHARACTERISTICS INFORMATION MANAGEMENT TABLE

| FILE SERVER DEVICE NAME | INTERNAL PATH NAME | VOLUME ID | RAID TYPE | HARD DISK DRIVE DEVICE PERFORMANCE |
|---|---|---|---|---|
| nas1 | /fs3 | vol3 | 1 | INTERMEDIATE |
| nas2 | – | vol5 | 5 | INTERMEDIATE |
| nas2 | /fs7 | vol7 | 1 | HIGH |

500a

SHARED DIRECTORY ADDRESS SETTINGS INFORMATION MANAGEMENT TABLE

| SHARED DIRECTORY ADDRESS PATH NAME | INTERNAL PATH NAME |
|---|---|
| /rdb | /fs3/rdb |

510a

AFTER SETTINGS CHANGE

STORAGE CHARACTERISTICS INFORMATION MANAGEMENT TABLE

| FILE SERVER DEVICE NAME | INTERNAL PATH NAME | VOLUME ID | RAID TYPE | HARD DISK DRIVE DEVICE PERFORMANCE |
|---|---|---|---|---|
| nas1 | – | vol3 | 1 | INTERMEDIATE |
| nas2 | /fs5 | vol5 | 5 | INTERMEDIATE |
| nas2 | /fs7 | vol7 | 1 | HIGH |

CHANGED

500b

SHARED DIRECTORY ADDRESS SETTINGS INFORMATION MANAGEMENT TABLE

| SHARED DIRECTORY ADDRESS PATH NAME | INTERNAL PATH NAME |
|---|---|
| /rdb | /fs5/rdb |

CHANGED

510b

FIG. 12

DIRECTORY SETTINGS FILE raidtype: 1
diskspce: HIGH nas.conf

200c

STORAGE CHARACTERISTICS INFORMATION MANAGEMENT TABLE

| FILE SERVER DEVICE NAME | INTERNAL PATH NAME | VOLUME ID | RAID TYPE | HARD DISK DRIVE DEVICE PERFORMANCE |
|---|---|---|---|---|
| nas1 | /fs3 | vol3 | 1 | INTERMEDIATE |
| nas2 | – | vol5 | 5 | INTERMEDIATE |
| nas2 | /fs7 | vol7 | 1 | HIGH |

500c

BEFORE SETTINGS CHANGE

SHARED DIRECTORY ADDRESS TRANSLATION TABLE

| LOGICAL SHARED DIRECTORY ADDRESS PATH NAME | PHYSICAL SHARED DIRECTORY ADDRESS |
|---|---|
| /rdb | nas1:/rdb |
| /webcontents | nas2:/webcontens |

530c

MIGRATION SOURCE FILE SERVER DEVICE SHARED DIRECTORY ADDRESS SETTINGS INFORMATION MANAGEMENT TABLE

| SHARED DIRECTORY ADDRESS PATH NAME | INTERNAL PATH NAME |
|---|---|
| /rdb | /fs3/rdb |

510Xc

MIGRATION DESTINATION FILE SERVER DEVICE SHARED DIRECTORY ADDRESS SETTINGS INFORMATION MANAGEMENT TABLE

| SHARED DIRECTORY ADDRESS PATH NAME | INTERNAL PATH NAME |
|---|---|
| /webcontents | /fs7/web |

510Yc

AFTER SETTINGS CHANGE

SHARED DIRECTORY ADDRESS TRANSLATION TABLE

| LOGICAL SHARED DIRECTORY ADDRESS PATH NAME | PHYSICAL SHARED DIRECTORY ADDRESS |
|---|---|
| /rdb | nas1:/rdb |
| /rdb/index | nas2:/rdb/index |
| /webcontents | nas2:/webcontens |

530d

ADDED

MIGRATION SOURCE FILE SERVER DEVICE SHARED DIRECTORY ADDRESS SETTINGS INFORMATION MANAGEMENT TABLE

| SHARED DIRECTORY ADDRESS PATH NAME | INTERNAL PATH NAME |
|---|---|
| /rdb | /fs3/rdb |

510Xd

MIGRATION DESTINATION FILE SERVER DEVICE SHARED DIRECTORY ADDRESS SETTINGS INFORMATION MANAGEMENT TABLE

| SHARED DIRECTORY ADDRESS PATH NAME | INTERNAL PATH NAME |
|---|---|
| /webcontents | /fs7/web |
| /rdb/index | /fs7/rdb/index |

ADDED

510Yd

FIG. 20

FILE SERVER THAT ALLOWS AN END USER TO SPECIFY STORAGE CHARACTERISTICS WITH EASE

Matter enclosed in heavy brackets [ ] appears in the original patent but forms no part of this reissue specification; matter printed in italics indicates the additions made by reissue.

CLAIM OF PRIORITY

The present application claims priority from Japanese patent application P2006-330594 filed on Dec. 7, 2006, the content of which is hereby incorporated by reference into this application.

BACKGROUND

This invention relates to a method of changing settings information of a shared directory, and more particularly, to a method of allowing a client computer operated by a user to send a request to change settings information of a shared directory.

File server devices, which enable multiple client computers connected to one another via a local area network (LAN) to share a file, are widely used in business organizations and the like.

A file server device provides client computers with a shared directory, an area in which a file is written.

Each shared directory is identified by an identifier unique throughout the network. An identifier assigned to a shared directory is called a shared directory address.

Once a shared directory address is specified and entered in an operating system (OS) or a file sharing client program that is run in the client computers, the client computers can store files in, or read files out of, a shared directory at the shared directory address.

A file server device may be mounted as a special-use computer.

There has been known a technique with which a computer running an OS executes a file sharing server program to assume the function of a file server device which provides a shared directory (see, for example, Non-patent Document 1: Jay Ts, Robert Eckstein, and David Collier-Brown, Using Samba, (U.S.) 2nd ed. (Sebastopol, C A: O'Reilly and Associates Inc., Feb. 2003), p. 1-3).

A file sharing server program receives, from a client computer connected to a file server device via a LAN, a request to access a file that is stored in a secondary storage system in the file server device, and uses a function of an OS run in the file server device to access the file stored in the secondary storage system.

The file sharing server program operates according to settings information which is described in a settings file stored in the file server device. The settings information is managed by an administrator commissioned by a user of the client computer.

The secondary storage system in the file server device is a single hard disk drive. Instead, a disk array device may serve as the secondary storage system when the secondary storage system needs to have a large storage capacity.

A disk array device is a combination of multiple hard disk drives to provide redundant virtual storage areas. Such virtual storage areas are called volumes.

One way to build a virtual hard disk drive by combining hard disk drives is a technology called redundant array of inexpensive disks (RAID). There are several different methods to combine hard disk drives and those variations are called RAID types. The price per capacity and price-performance ratio of a volume vary depending on the RAID type.

The price-performance ratio is also varied depending on the specification of the single hard disk drive. Therefore, a RAID type and a single hard disk drive that are suitable to the use of the secondary storage system should be chosen. Another factor that can make the performance, capacity, and the like to vary is the specification of the disk array device itself.

In an environment where a large storage capacity is necessary, many file server devices are connected to a single LAN. A shared directory in such an environment is migrated among the file server devices to balance, for example, the access load applied to the individual file server devices. This improves the overall price-performance ratio of the computer system.

However, migration of a shared directory makes it necessary for a user of a client computer to specify and enter a new shared directory address assigned to the migrated shared directory in the client computer without fail.

Global name space (GNS) is a known technology to relocate a shared directory in this type of environment in a manner that makes the relocation transparent to client computers (see, for example, Non-patent Document 2: Jon William Toigo, The Holy Grail of Network Storage Management (Indianapolis: Prentice Hall Professional Technical Reference, Oct. 2003), p. 61-64).

GNS is a technology for translating a logical shared directory address that is specified and entered in a client computer into a physical shared directory address at which a shared directory is actually located. GNS makes it possible to access a migrated shared directory by entering the same logical shared directory address that has been used prior to the relocation in the client computer, despite a change in physical shared directory address of the shared directory that accompanies the migration.

A user of a client computer may wish to change settings information of a shared directory such that the shared directory is placed in a file server device, a disk array device, a volume, or the like that has the optimum storage characteristics from the viewpoints of, for example, price per capacity and price-performance ratio according to the type, utilization state, and the like of files stored in the shared directory.

Conventionally, a user of a client computer accessing a file server device who wishes to change settings information of a shared directory notifies the administrator of new settings as well as the network address of the shared directory of which settings information is to be changed, and asks the administrator to change settings information of the shared directory.

Receiving the request, the administrator directly changes settings information of the shared directory or operates a management program or the like to change settings information of the shared directory. In short, the administrator changes setting information of each shared directory separately.

One of common ways for a user to request the administrator to change settings information of a shared directory is e-mail.

A Web server program Apache provides a user who publishes contents online with a measure to change settings information of a directory in which the contents are stored without the intervention of the administrator. Apache changes settings information of the directory storing the materials when a settings file which describes settings of the directory is stored in the directory (see, for example, Non-patent Document 3:

Ivan Ristic, Apache Security (Sebastopol, C A: O'Reilly and Associates Inc., May 2005), p. 137-139).

SUMMARY

In the prior art, a user who wishes to change settings information of a shared directory has to specify the address of the shared directory of which setting information is to be changed.

This leaves a risk that the user enters a wrong address for the shared directory of which settings information is to be changed, and a risk that the administrator asked to change settings information of the shared directory misreads the address of the shared directory, new settings information, and other information entered by the user.

A first problem with the prior art is, therefore, that there are many chances for wrong settings information to be set in a shared directory.

A second problem with the prior art is that a user has to specify new settings information for each shared directory of which settings information is to be changed. Specifying new settings information for each shared directory of which settings information is to be changed is inefficient and a tedious work for a user when the same settings information is to be set in two or more shared directories.

The first and second problems with the prior art are particularly noticeable in a computer system having a file server device that manages many files and users.

The technology described in Non-patent Document 3 enables a user to change settings information about the right to refer to a directory in a Web server. Also, a Web server described in this document has a measure to prevent a user from changing directory settings information by mistake and a measure to reuse settings information.

However, the technology described in Non-patent Document 3 is about a request to refer to a file in a Web server and, when applied to a computer system that has a file server device, does not enables a user to change settings information of a secondary storage system or a file system where data is stored. Therefore, applying the technology described in Non-patent Document 3 to a file server device does not solve the first and second problems with the prior art.

This invention has been made in view of the above-mentioned problems, and it is therefore an object of this invention to provide a file server device that has less chance of error in changing directory settings information. Another object of this invention is to provide a file server device that can reuse directory settings information.

According to an aspect of the present invention, there is provided a method of changing settings information of a shared directory in a computer system comprising at least one file server device, a client computer and a storage system, the settings information of the shared directory provided by the file server device, the file server device being accessible from the client computer, the storage system being accessible from the file server device, the client computer having a first processor, which performs computation processing, a first storage unit, which is coupled to the first processor, and a first interface, which is coupled to the first processor, the file server device having a second processor, which performs computation processing, a second storage unit, which is coupled to the second processor, and a second interface, which is coupled to the second processor, the storage system having a third processor, which performs computation processing, a third interface, which is coupled to the third processor, and a third storage unit in which at least one volume including a storage area, the method comprising: sending, by the first processor, a write request to the file server device via the first interface and the second interface in order to request to write, in the shared directory whose settings information is to be changed, a directory settings file that describes new settings information for this shared directory; storing, in the second storage unit, storage characteristics information in which settings information of the volume is registered; providing, by the second processor, the client computer with a shared directory which is included in at least one volume included in the third storage unit; writing, by the second processor, in case of receiving the request to write the directory settings file via the first interface and the second interface, the directory settings file in the shared directory according to the received directory settings file writing request; referring, by the second processor, to the storage characteristics information to select, as data migration destination candidate, at least one volume whose settings information matches the new settings information described in the directory settings file; obtaining, by the second processor, information for identifying the selected volume; and executing, by the second processor, settings changing processing of migrating information from the shared directory in which the directory settings file is written to one of the selected volume.

According to an aspect of this invention, error in directory settings information can be avoided.

BRIEF DESCRIPTION OF THE DRAWINGS

The present invention can be appreciated by the description which follows in conjunction with the following figures, wherein:

FIG. 7 is a diagram showing a configuration of a shared directory address translation table according to the embodiment of this invention;

FIG. 8 is a diagram showing a configuration of a volume settings information management table according to the embodiment of this invention;

FIG. 9 is a diagram showing a configuration of a shared directory address settings information management table according to the embodiment of this invention;

FIG. 10 is a diagram showing a configuration of a storage characteristics information management table according to the embodiment of this invention;

FIG. 12 is a diagram illustrating tables before and after a change of settings of a shared directory that accompanies volume-basis data migration within the same file server device according to the embodiment of this invention;

FIG. 20 is a diagram illustrating tables before and after a change of shared directory settings information which is caused by moving information from the shared directory to the volume in the disk array device that is connected to another file server device according to the modification example of the embodiment of this invention.

DETAILED DESCRIPTION OF THE PREFERRED EMBODIMENT

A file server device according to this embodiment changes settings information of a shared directory when a directory setting file describing new settings information is written in the shared directory.

This enables a user to change shared directory settings information by himself/herself correctly without asking an administrator to change shared directory settings information. This also makes it possible to change settings information of multiple devices by writing a directory settings file once. Further, different shared directories can be changed the same settings information simply by making copies of the same directory settings file and storing the copies in different shared directories. Another advantage of a file server device according to this embodiment is that, even when shortage of free capacity or the like hinders the file server device from changing the current settings information of a shared directory to settings information that is described in a directory settings file, the settings information of the shared directory can still be changed when an expansion of a disk array device or the like creates a volume that matches the settings information described in the directory settings file. A shared directory can thus be set to optimum settings for the configuration of a device that constitutes a computer system.

Effects of this embodiment are prominent particularly in an intricate computer system having file server devices of different configurations, multiple disk array devices, a GNS server device, and others. A file server device according to this embodiment is applicable also to a computer system that does not have a disk array device and a GNS server device.

The embodiment of this invention is now described with reference to the accompanying drawings.

Figure 1:
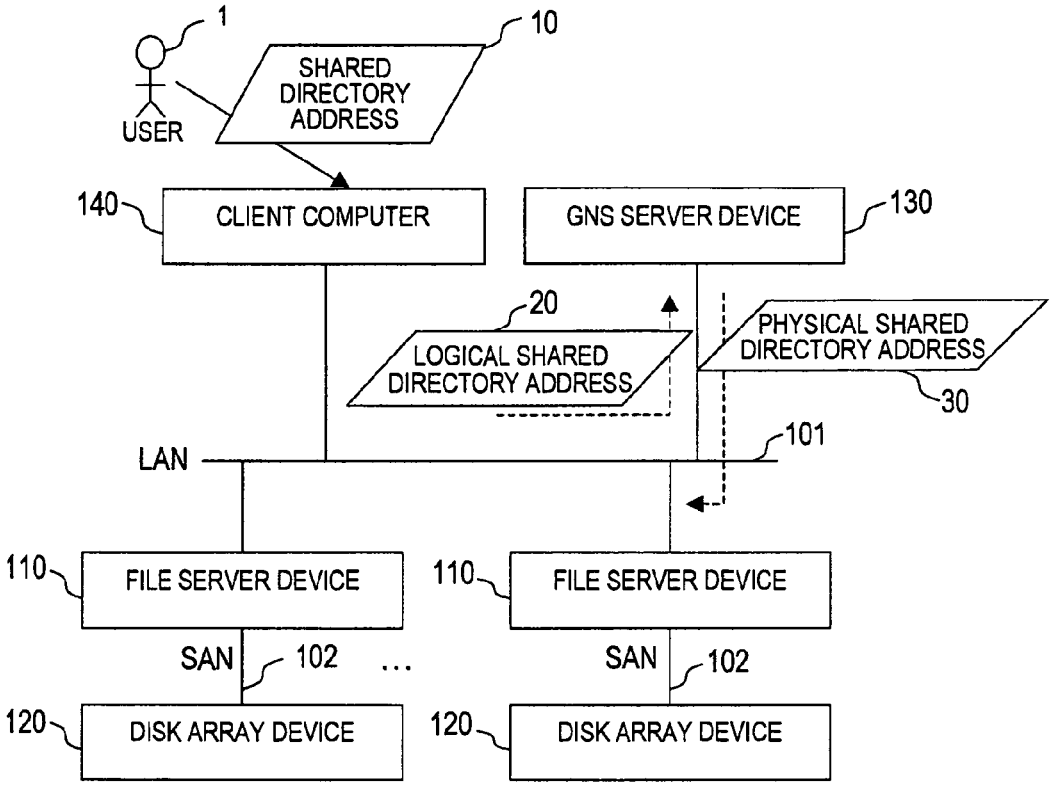
FIG. 1 is a block diagram of a computer system according to an embodiment of this invention.

FIG. 1 is a block diagram of a computer system according to the embodiment of this invention.

This computer system has a file server device 110, a disk array device 120, a global name space (GNS) server device 130, and a client computer 140.

The file server device 110, the GNS server device 130, and the client computer 140 are connected to one another via a local area network (LAN) 101. The file server device 110 and the disk array device 120 are connected to each other via a storage area network (SAN) 102.

FIG. 1 shows two file server devices 110 and disk array device 120 each, but the computer system may have at least one file server device 110 and disk array devices 120.

The client computer 140 is a computer operated by a user 1. The hardware configuration of the client computer 140 will be described in detail with reference to FIG. 4.

A shared directory address 10 specified by the user 1 is entered in the client computer 140. The shared directory address 10 is the address of a shared directory provided by the file server device 110. Specifically, the shared directory address 10 specifies the name of a server device that the client computer 140 accesses and the name of a path to a shared directory that the client computer 140 accesses. The name of the GNS server device 130 is specified as a server device name. The format of the shared directory address 10 will be described in detail with reference to FIG. 2.

When the specified shared directory address 10 is entered, the client computer 140 sends an access request to the GNS server device 130 according to the specified shared directory address 10.

The GNS server device 130 translates the shared directory address 10 (logical shared directory address 20) specified by the user 1 into a physical shared directory address 30. The hardware configuration of the GNS server device 130 will be described in detail with reference to FIG. 5.

The physical shared directory address 30 is the physical address of a shared directory provided by the file server device 110 which is connected to the GNS server device 130 via the LAN 101. The logical shared directory address 20 and the physical shared directory address 30 have the same format as that of the shared directory address 10.

After converting a logical shared directory address 20 into the physical shared directory address 30, the GNS server device 130 forwards the shared directory access request, which has been sent by the client computer 140, to the file server device 110.

The user 1 thus does not need to know the physical address of the file server device 110 that provides a shared directory that the user 1 wishes to access to make the client computer 140 access the shared directory, and instead, only has to specify and enter the shared directory address 10 in the client computer 140. For instance, after the configuration is changed such that another file server device 110 provides a shared directory, the user 1 can access the shared directory only by specifying and entering the same shared directory address 10 that has been used before the configuration change in the client computer 140.

The file server device 110 may be equipped with the functions of the GNS server device 130.

The disk array device 120 is a storage system for storing data. The disk array device 120 serves as a secondary storage system of the file server device 110. The hardware configuration of the disk array device 120 will be described in detail with reference to FIG. 6. The disk array device 120 may be equipped with functions of the file server device 110.

The file server device 110 receives a request to access a shared directory which is sent by the client computer 140, and accesses the shared directory in the disk array device 120. The hardware configuration of the file server device 110 will be described in detail with reference to FIG. 6.

Figure 3:
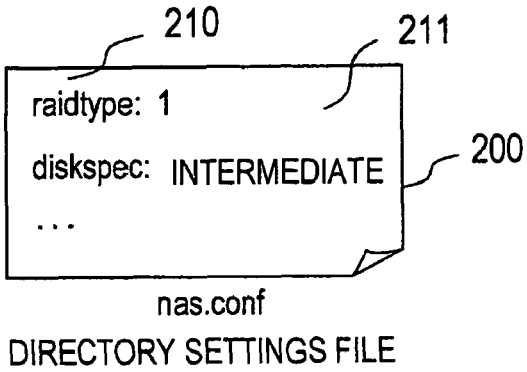
FIG. 3 is a diagram showing a configuration of a directory settings file according to the embodiment of this invention.

The file server device 110 also receives a directory settings file 200, which is sent by the client computer 140 and which is shown in FIG. 3. Receiving the directory settings file 200, the file server device 110 changes a shared directory by changing settings of the disk array device 120 that is connected to this file server device 110, settings of another file server device 110, and settings of the GNS server device 130. The directory settings file 200 will be described in detail with reference to FIG. 3.

It is also possible to apply the present invention to only one device chosen out of the file server device 110, the disk array device 120 connected to the file server device 110, and the GNS server device 130.

Figure 2:
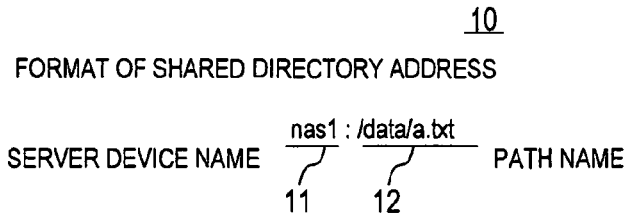
FIG. 2 is a diagram illustrating a format of a shared directory address, a logical shared directory address, and a physical shared directory address according to the embodiment of this invention.

FIG. 2 is a diagram illustrating the format of the shared directory address 10, the logical shared directory address 20, and the physical shared directory address 30 (hereinafter referred to as address format) according to the embodiment of this invention.

The address format contains a server device name 11 and a path name 12. The name of a server device to be accesses is specified as the server device name 11. As the path name 12, the name of a path to a shared directory to be accessed is specified.

For instance, in case of the shared directory address 10 or the logical shared directory address 20, the name of the GNS server device 130 is specified as the server device name 11, and the name of a path to a shared directory to be accessed is specified as the path name 12.

In a case of the physical shared directory address 30, the name of the file server device 110 is specified as the server device name 11, and a path name specified by the logical shared directory address 20 is designated as the path name 12.

A path name specified by the logical shared directory address 20 is designated as the path name 12 of the physical shared directory address 30 in this embodiment for making the explanation simple. However, an arbitrary path name may be specified instead of a path name specified by the logical shared directory address 20.

FIG. 3 is a diagram showing a configuration of the directory settings file 200 according to the embodiment of this invention.

The directory settings file 200 is a file in which settings information of a shared directory is described. The directory settings file 200 is created by the client computer 140. Settings of a shared directory are changed when the directory settings file 200 is stored in the shared directory.

The directory settings file 200 has a file name "nas.conf". The file server device 110 judges a file stored in a shared directory as the directory settings file 200 when the file has the file name "nas.conf", and as a normal file when the file has other file names than "nas.conf".

The directory settings file 200 contains a settings item name 210 and a set value 211.

Registered as the settings item name 210 is the name of a shared directory settings item that is to be changed. The set value of the item to be changed is registered as the set value 211.

Figure 6:
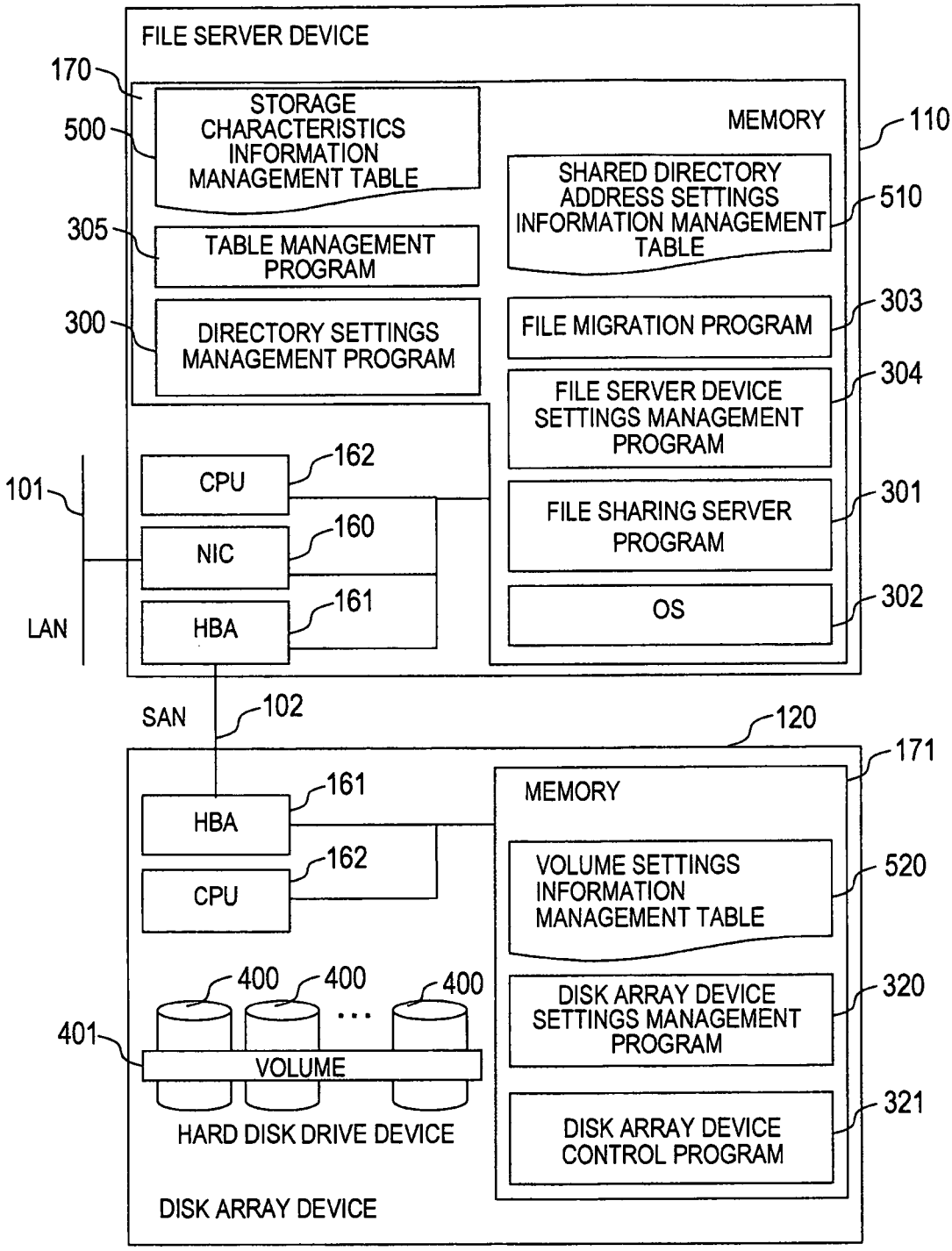
FIG. 6 is a block diagram of a file server device and a disk array device according to the embodiment of this invention.

For instance, "raidtype" and "diskspec" are registered as the settings item name 210. The item name "raidtype" indicates the RAID type of a volume where a shared directory of which settings are to be changed is located, whereas "diskspec" indicates the performance of the volume where the shared directory is located (volume 401 shown in FIG. 6). A performance of the volume 401 is determined by, for example, how the file server device 110 and the disk array device 120 are connected and the maximum number of revolutions of a hard disk drive device 400, which is provided in the disk array device 120 and which is shown in FIG. 6.

An instruction to execute maintenance operation such as taking a backup may be written as the settings item name 210.

The client computer 140, the GNS server device 130, the file server device 110, and the disk array device 120 will be described next with reference to FIGS. 4 to 6.

Figure 4:
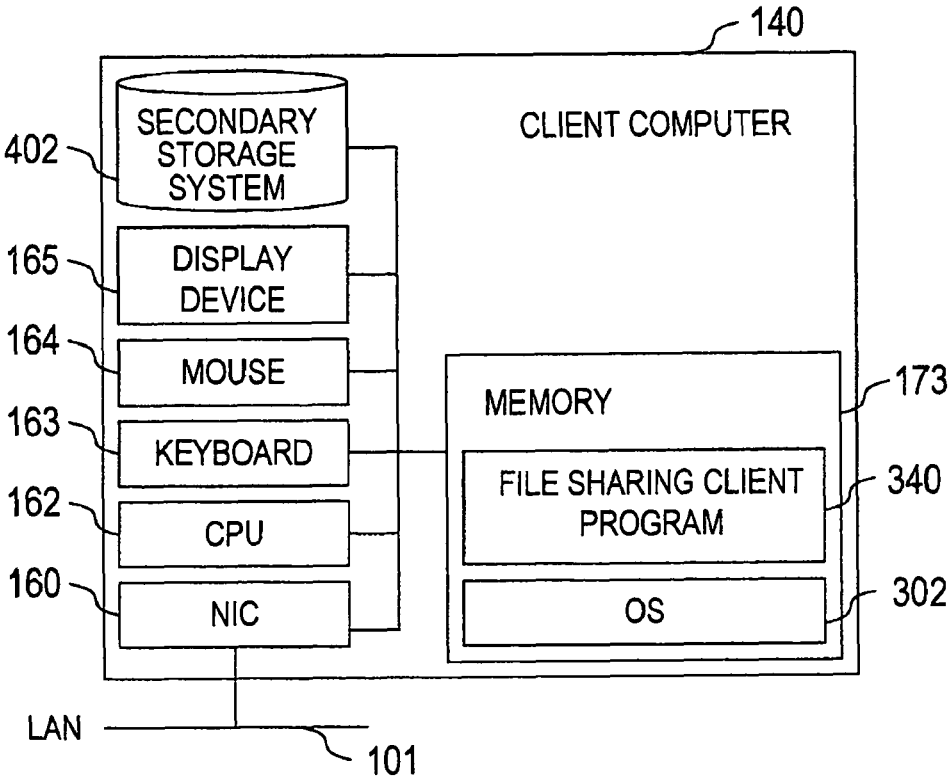
FIG. 4 is a block diagram of a client computer according to the embodiment of this invention.

FIG. 4 is a block diagram of the client computer 140 according to the embodiment of this invention.

The client computer 140 has a network interface card (NIC) 160, a CPU 162, a keyboard 163, a mouse 164, a display device 165, a memory 173, and a secondary storage system 402.

The keyboard 163 and the mouse 164 are input measures. The display device 165 is an output measure. The user 1 operates the client computer 140 through the keyboard 163 and the mouse 164 while checking information output to the display device 165.

The NIC 160 in the client computer 140 is an interface that connects the client computer 140 to the LAN 101.

The CPU 162 in the client computer 140 loads various programs stored in the secondary storage system 402 onto the memory 173, and executes the programs loaded onto the memory 173.

The secondary storage system 402 in the client computer 140 stores an OS 302 and a file sharing client program 340. The OS 302 and the file sharing client program 340 are loaded onto the memory 173 when the client computer 140 is booted.

The OS 302 in the client computer 140 is a program that controls the operation of the client computer 140. The file sharing client program 340 is a program that enables the client computer 140 to access a file stored in a shared directory, which is provided by the file server device 110.

When the client computer 140 is to access a shared directory, the file sharing client program 340 sends a request to access the shared directory to a file sharing server program 301 shown in FIG. 6. The file sharing server program 301 that receives this access request is one stored in the file server device 110 that provides the shared directory to be accessed. The access request contains a shared directory address that is specified by the user 1 as the shared directory address of the shared directory to be accessed.

Figure 5:
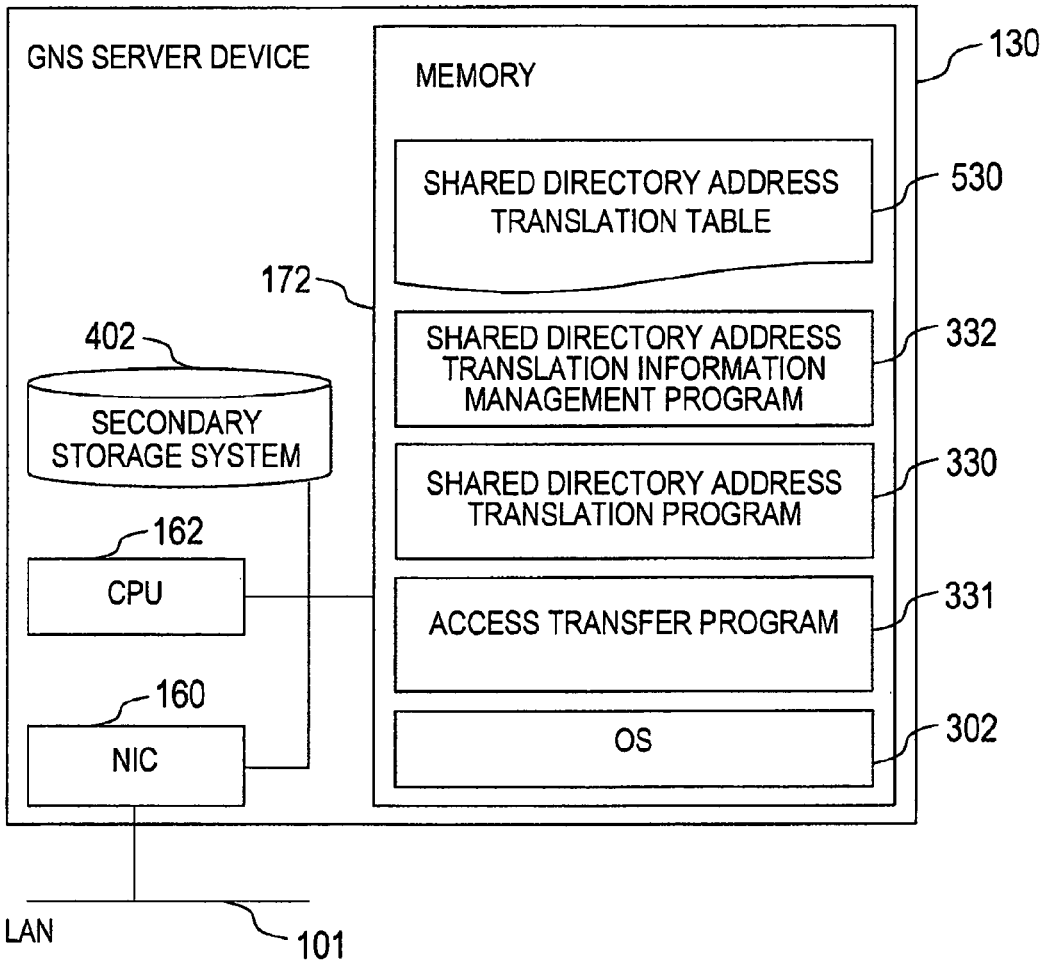
FIG. 5 is a block diagram of a GNS server according to the embodiment of this invention.

FIG. 5 is a block diagram of the GNS server device 130 according to the embodiment of this invention.

The GNS server device 130 has the NIC 160, the CPU 162, a memory 172, and the secondary storage system 402.

The NIC 160 in the GNS server device 130 is an interface that connects the GNS server device 130 to the LAN 101.

The CPU 162 in the GNS server device 130 loads various programs stored in the secondary storage system 402 onto the memory 172, and executes the programs loaded onto the memory 172.

The secondary storage system 402 in the GNS server device 130 stores a shared directory address translation program 330, an access transfer program 331, a shared directory address translation information management program 332, the OS 302, and a shared directory address translation table 530. The shared directory address translation program 330, the access transfer program 331, the shared directory address translation information management program 332, the OS 302, and the shared directory address translation table 530 are loaded onto the memory 172 when the GNS server device 130 is booted.

The shared directory address translation table 530 is used to manage the association relation between the logical shared directory address 20 and the physical shared directory address 30. The shared directory address translation table 530 will be described in detail with reference to FIG. 7.

The shared directory address translation program 330 refers to the shared directory address translation table 530 to translate the logical shared directory address 20 sent by the client computer 140 into the physical shared directory address 30 of a shared directory that is provided by one of the file server devices 110 connected to the GNS server device 130 via the LAN 101.

The access transfer program 331 forwards a shared directory access request sent from the client computer 140 to the file server device 110 that is identified by a name registered as the server device name 11 in the physical shared directory address 30. The access request sent by the access transfer program 331 contains the physical shared directory address 30 obtained through the translation.

The shared directory address translation information management program 332 changes an association relation registered in the shared directory address translation table 530. When the GNS server device 130 receives a request to change settings in the shared directory address translation table 530 from the file server device 110, the shared directory address translation information management program 332 adds a new association relation to the shared directory address translation table 530, and deletes or changes an association relation registered in the shared directory address translation table 530.

The OS 302 in the GNS server device 130 controls the operation of the GNS server device 130.

The GNS server device 130 receives a request to access a shared directory which is sent by the client computer 140. The GNS server device 130 forwards the received shared directory access request to the file server device 110 that actually provides the shared directory. The client computer 140 can thus access the shared directory.

FIG. 6 is a block diagram of the file server device 110 and disk array device 120 according to the embodiment of this invention.

The disk array device 120 will be described first.

The disk array device 120 has a host bus adapter (HBA) 161, the CPU 162, a memory 171, and multiple hard disk drive devices 400.

The HBA 161 in the disk array device 120 is an interface that connects the disk array device 120 to the SAN 102.

The volume 401 is a logical storage area formed from different hard disk drive devices 400. The disk array device 120 provides more than one volume 401.

The volume 401 stores a disk array device settings management program 320, a disk array device control program 321, a volume settings information management table 520, a directory settings management program 300, the file sharing server program 301, the OS 302, a file migration program 303, a file server device settings management program 304, a table management program 305, a storage characteristics information management table 500, and a shared directory address settings information management table 510.

The disk array device settings management program 320, the disk array device control program 321, and the volume settings information management table 520 are loaded onto the memory 171 when the disk array device 120 is booted. The CPU 162 executes the disk array device settings management program 320 and the disk array device control program 321 that are loaded onto the memory 171.

The volume settings information management table 520 is used to manage settings information of the volume 401. The volume settings information management table 520 will be described in detail with reference to FIG. 8.

The disk array device settings management program 320 adds new settings information to the volume settings information management table 520, and deletes or changes settings information registered in the volume settings information management table 520. The disk array device settings management program 320 also sends settings information registered in the volume settings information management table 520 to the file server device 110.

The disk array device control program 321 controls the operation of the disk array device 120. The disk array device control program 321 creates the volume 401 that has a RAID type specified by the file server device 110. Another function of the disk array device control program 321 is to migrate data from one volume 401 to another volume 401 that is in the same disk array device 120. The disk array device control program 321 also migrates data from the volume 401 in one disk array device 120 to the volume 401 in another disk array device 120.

The file server device 110 will be described next.

The file server device 110 has the NIC 160, the HBA 161, the CPU 162, and a memory 170.

The NIC 160 in the file server device 110 is an interface that connects the file server device 110 to the LAN 101. The HBA 161 in the file server device 110 is an interface that connects the file server device 110 to the SAN 102.

The directory settings management program 300, the file sharing server program 301, the OS 302, the file migration program 303, the file server device settings management program 304, the table management program 305, the storage characteristics information management table 500, and the shared directory address settings information management table 510 are loaded onto the memory 170 when the file server device 110 is booted. The CPU 162 then executes the directory settings management program 300, the file sharing server program 301, the OS 302, the file migration program 303, the file server device settings management program 304, and the table management program 305.

The OS 302 in the file server device 110 controls the operation of the file server device 110. The OS 302 also manages a file system created in the volume 401.

The storage characteristics information management table 500 is used to manage settings information of a shared directory provided by the file server device 110. The storage characteristics information management table 500 will be described in detail with reference to FIG. 10.

The shared directory address settings information management table 510 is used to manage information for translating a path name in the physical shared directory address 30 into the name of an internal path to a file system. The shared directory address settings information management table 510 will be described in detail with reference to FIG. 9.

The file sharing server program 301 provides a shared directory. Specifically, the file sharing server program 301 receives a shared directory access request forwarded by the GNS server device 130. There are, for example, two types of access requests, a reading request to read a file out of a shared directory and a writing request to write a file in a shared directory.

The file sharing server program 301 refers to the shared directory address settings information management table 510 to translate a path name in the physical shared directory address 30 contained in the received access request into the name of an internal path to a file system.

The file sharing server program 301 then uses the function of the OS 302 to access the internal path name obtained through the translation. Specifically, the file sharing server program 301 reads a file out of a shared directory when the received access request is a reading request. When the received access request is a writing request, the file sharing server program 301 stores a file in a shared directory.

The file sharing server program 301 also activates the directory settings management program 300 when the received access request is a writing request.

In a case where the received access request is judged as other requests than a request to write in a shared directory, the file sharing server program 301 does not activate the directory settings management program 300.

The directory settings management program 300 judges whether or not a file written in a shared directory is the directory settings file 200. When the file written in the shared directory is judged as the directory settings file 200 and information described in the directory settings file 200 does not coincide with the current settings of the shared directory, the directory settings management program 300 executes settings changing processing in order to make the settings of the shared directory consistent with the information in the directory settings file 200.

Specifically, the directory settings management program 300 reads the directory settings file 200 stored at the file system internal path name. The directory settings management program 300 then refers to the storage characteristics information management table 500 to judge whether or not information described in the read directory settings file 200 coincides with the current shared directory settings.

In judging that the information described in the directory settings file 200 does not coincide with the current shared directory settings, the directory settings management program 300 chooses a device and a program that are necessary to make the shared directory settings consistent with the information described in the read directory settings file 200, and sends a request to change settings to the chosen device and program.

While in judging that the information described in the directory settings file 200 coincides with the current shared directory settings, the directory settings management program 300 does not issue a request to change settings.

The directory settings management program 300 activates the table management program 305 in a case where the storage characteristics information management table 500 is referred to.

The table management program 305 refers to the storage characteristics information management table 500. The table management program 305 also updates the storage characteristics information management table 500. Specifically, the table management program 305 adds new shared directory settings information to the storage characteristics information management table 500, and deletes or changes shared directory settings information registered in the storage characteristics information management table 500. A common database management system (DBMS) program serves as the table management program 305.

In the case of a computer system that has multiple file server devices 110 as in this embodiment, the table management program 305 that is executed by one file server device 110 has the table management program 305 that is executed by another file server device 110 retrieve shared directory settings information from the storage characteristics information management table 500 of the other file server device 110. The former table management program 305 incorporates the retrieved shared directory settings information, and then refers to the consolidated shared directory settings information.

This enables the directory settings management program 300 in one file server device 110 to refer to the storage characteristics information management table 500 of any other file server device 110 in the computer system by simply executing the table management program 305 that is stored in its own file server device 110.

The file server device settings management program 304 is a program for changing settings information of programs that give the file server device 110 the function of providing a shared directory. The programs that give the file server device 110 the function of providing a shared directory include the file sharing server program 301, the OS 302, and others.

In case where the file server device settings management program 304 receives a request to change settings the file server device settings management program 304 responds to the request by adding, deleting, or changing the association relation between a shared directory address path name and a file system internal path name registered in the shared directory address settings information management table 510. The file server device settings management program 304 then sends, to the file sharing server program 301 and the OS 302, the changed settings of the association relation between a shared directory address path name and a file system internal path name registered in the shared directory address settings information management table 510. The file server device settings management program 304 also sends the current settings information in response to a settings information inquiry made by another program.

The file migration program 303 migrates data from a migration source shared directory to a migration destination shared directory when the name of an internal path to the migration source shared directory and the name of an internal path to the migration destination shared directory are entered. In short, the file migration program 303 migrates data stored in shared directories on a shared directory basis. In a case where the migration destination of data in a shared directory is a shared directory that is provided by another file server device 110, the file migration program 303 migrates the data across different file server devices 110.

The directory settings management program 300 in this embodiment is activated when the file sharing server program 301 receives a request to write a file in a shared directory and the file written in the shared directory is judged as the directory settings file 200.

Alternatively, the file sharing server program 301 may activate the directory settings management program 300 when writing of a new file is detected through monitoring of files that are stored in a shared directory. The file sharing server program 301 may also activate the directory settings management program 300 when an update of time stamp for registering the date/time of creation or modification of a file is detected through monitoring of the time stamp.

The file server device 110 may store a program that periodically monitors the file sharing server program 301, the OS 302, and files.

The directory settings management program 300 is activated, in some cases, as a result of a change in configuration of the computer system such as an addition of a new disk array device 120 or file server device 110.

When the configuration of the computer system is changed, the file sharing server program 301 judges whether or not a shared directory provided by the file server device 110 is storing the directory settings file 200. Judging that there is the directory settings file 200 in a shared directory provided by the file server device 110, the file sharing server program 301 activates the directory settings management program 300.

In this way, when the configuration of the computer system is changed, the directory settings file 200 that has already been in a shared directory can be detected again and the shared directory can be set anew according to the detected file.

FIG. 7 is a diagram showing a configuration of the shared directory address translation table 530 according to the embodiment of this invention.

The shared directory address translation table 530 holds a logical shared directory address path name 531 and a physical shared directory address 532.

As the logical shared directory address path name 531, a path name contained in the logical shared directory address 20 is registered. A physical shared directory address that is associated with the logical shared directory address path name 531 is registered as the physical shared directory address 532. The physical shared directory address 532 is constituted by adding the name of the file server device 110 that provides a specified shared directory to a path name contained in the logical shared directory address 20.

FIG. 8 is a diagram showing a configuration of the volume settings information management table 520 according to the embodiment of this invention.

The volume settings information management table 520 holds a volume ID 521, a RAID type 522, and hard disk drive device performance 523.

Registered as the volume ID 521 is an identifier uniquely assigned to each volume 401 in the disk array device 120. A RAID type set to the volume 401 is registered as the RAID type 522. The performance of each hard disk drive device 400 constituting the volume 401 is registered as the hard disk drive device performance 523. Specifically, one of "low", "intermediate", and "high" is registered as the hard disk drive device performance 523.

FIG. 9 is a diagram showing a configuration of the shared directory address settings information management table 510 according to the embodiment of this invention.

The shared directory address settings information management table 510 holds a shared directory address path name 511 and a shared directory internal path name 512.

Registered as the shared directory address path name 511 is the name of a path to a shared directory. Registered as the shared directory internal path name 512 is the name of an internal path through which the file server device 110 that provides the shared directory accesses the shared directory. Specifically, the shared directory internal path name 512 is constituted by adding the name of a path to the volume 401 that holds a shared directory in question to the shared directory address path name 511.

FIG. 10 is a diagram showing a configuration of the storage characteristics information management table 500 according to the embodiment of this invention.

The storage characteristics information management table 500 holds a file server device name 501, an internal path name 502, a volume ID 503, a RAID type 504, and hard disk drive device performance 505.

Registered as the file server device name 501 is the name of the file server device 110. The name of an internal path used by the file server device 110 to access the volume 401 is registered as the internal path name 502.

A unique identifier assigned to the volume 401 in the file server device 110 is registered as the volume ID 503. A RAID type set to the volume 401 is registered as the RAID type 504. The performance of each hard disk drive device constituting the volume 401 is registered as the hard disk drive device performance 505.

The storage characteristics information management table 500 in its initial state holds relevant information registered as the file server device name 501, the internal path name 502, and the volume ID 503, whereas there is no information registered as the RAID type 504 and the hard disk drive device performance 505.

The directory settings management program 300 causes the disk array device settings management program 320 to obtain, from the volume settings information management table 520, settings information of the volume 401 that is identified by an identifier registered as the volume ID 503. Specifically, the disk array device settings management program 320 fetches information registered as the RAID type 522 and the hard disk drive device performance 523.

The directory settings management program 300 then causes the table management program 305 to register, as the RAID type 504 and the hard disk drive device performance 505, the settings information obtained by the disk array device settings management program 320.

The storage characteristics information management table 500 is updated by the table management program 305 each time the directory settings management program 300 changes settings information.

The computer system may have a computer for managing storage characteristics information of every volume 401 of each disk array device 120 in the computer system. In this case, to refer to the storage characteristics information management table 500, the file server device 110 accesses the computer that manages storage characteristics information. The computer that manages the storage characteristics information management table 500 may be one of the file server devices 110.

Described next is processing of changing settings information of a shared directory when the shared directory address translation table 530 stored in the GNS server device 130 is not changed.

A case will be described with reference to FIGS. 11 and 12 in which settings information of a shared directory is changed as a result of migrating information in the volume 401 where the shared directory is located to another volume 401 of the same file server device 110.

Figure 11:
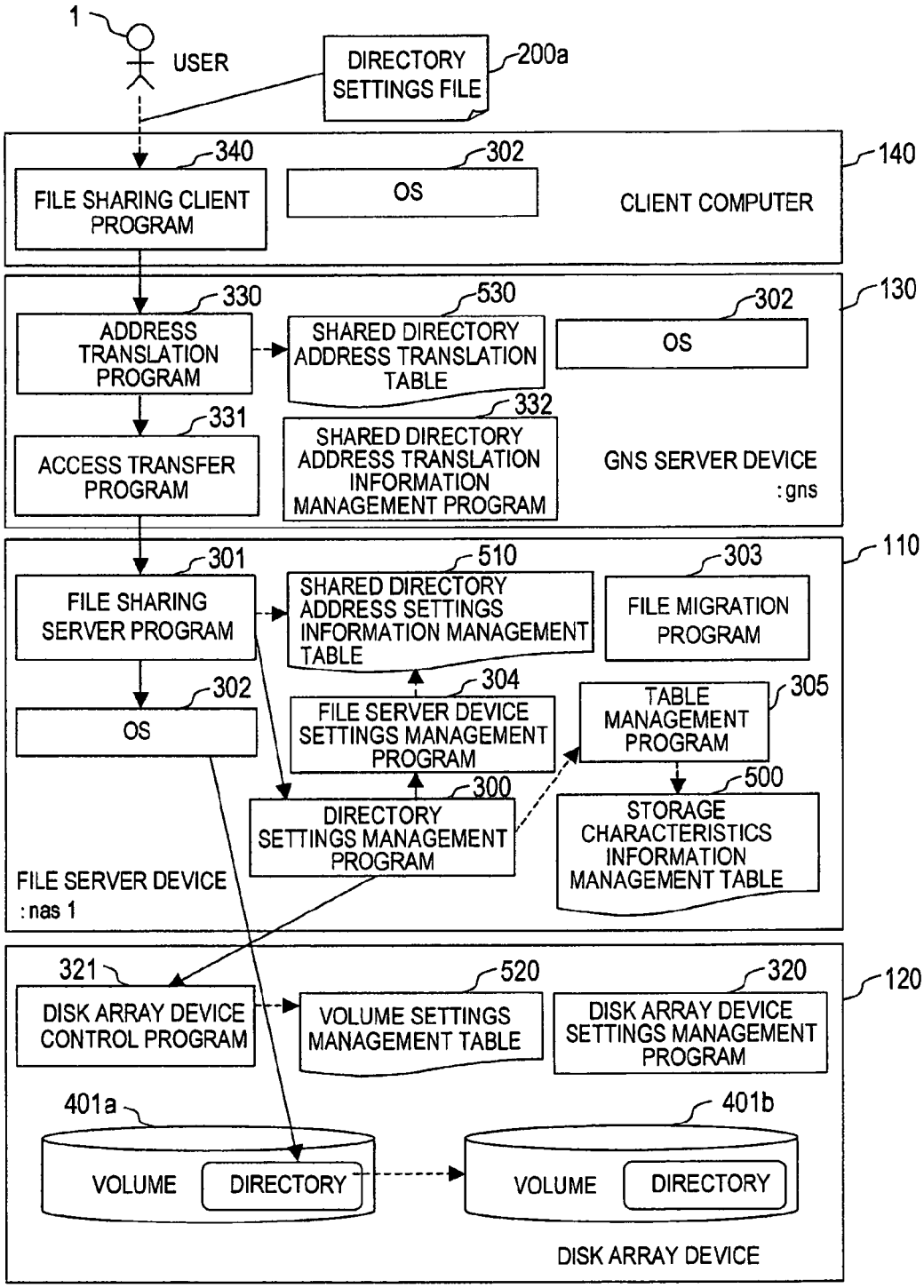
FIG. 11 is a sequence diagram for a change of shared directory settings which accompanies volume-basis data migration within the same file server device according to the embodiment of this invention.

FIG. 11 is a sequence diagram for a change of shared directory settings that accompanies volume-basis data migration within the same file server device 110 according to the embodiment of this invention.

FIG. 12 is a diagram illustrating the tables before and after a change of settings of a shared directory that accompanies volume-basis data migration within the same file server device 110 according to the embodiment of this invention.

A directory settings file 200a shown in FIG. 12 is described in the same format as the directory settings file 200 shown in FIG. 3. The directory settings file 200a describes a settings change to change the raidtype to "5" and the diskspec to "intermediate".

A shared directory address translation table 530a shown in FIG. 12 has the same format as the shared directory address translation table 530 shown in FIG. 7.

Storage characteristics information management tables 500a and 500b shown in FIG. 12 have the same format as the storage characteristics information management table 500 shown in FIG. 10. The storage characteristics information management table 500a is the storage characteristics information management table 500 before shared directory settings information is changed. The storage characteristics information management table 500b is the storage characteristics information management table 500 after shared directory settings information is changed.

Shared directory address settings information management table 510a and 510b have the same format as the shared directory address settings information management table 510 shown in FIG. 9. The shared directory address settings information management table 510a is the shared directory address settings information management table 510 before shared directory address settings information is changed. The shared directory address settings information management table 510b is the shared directory address settings information management table 510 after shared directory address settings information is changed.

The directory settings file 200a is written in a shared directory that has a path name "/rdb". The directory settings file 200a describes a settings change in which the RAID type of the volume 401 containing the shared directory that has a path name "/rdb" is changed to RAID5 and the hard disk drive device performance of this volume 401 containing the shared directory that has a path name "/rdb" is changed to "intermediate".

The directory settings file 200a is written by the user 1 operating the client computer 140. The user 1 designates "gns:/rdb" as a shared directory address for the directory settings file 200a.

The file sharing client program 340 sends a request to write the directory settings file 200a to the GNS server device 130 that has a server device name "gns".

Receiving the request to write the directory settings file 200a, the GNS server device 130 activates the shared directory address translation program 330. The shared directory address translation program 330 refers to the shared directory address translation table 530a, and translates the logical shared directory address path name "/rdb" into a physical shared directory address "nas1:/rdb".

Specifically, the shared directory address translation program 330 chooses from among entries registered in the shared directory address translation table 530 one whose logical shared directory address path name 531 matches the logical shared directory address path name "/rdb" contained in the received request to write the directory settings file 200a. The shared directory address translation program 330 then translates the logical shared directory address path name "/rdb" contained in the received request to write the directory settings file 200a into a physical shared directory address "nas1:/rdb" registered as the physical shared directory address 532 in the chosen entry.

The request to write the directory settings file 200a is then forwarded by the access transfer program 331 to the file server device 110 that has a server device name "nas1".

Receiving the request to write the directory settings file 200a, the file server device 110 activates the file sharing server program 301.

The file sharing server program 301 refers to the shared directory address settings information management table 510a, and translates the physical shared directory address path name "/rdb" into an internal path name "/fs3/rdb".

Specifically, the file sharing server program 301 chooses from among entries registered in the shared directory address settings information management table 510a one whose shared directory address path name 511 matches the physical shared directory address path name "/rdb" of the received directory settings file 200a. The file sharing server program 301 translates the physical shared directory address path name "/rdb" of the received directory settings file 200a into an internal path name "/fs3/rdb" registered as the internal path name 512 in the chosen entry.

The file sharing server program 301 then uses the function of the OS 302 to write the directory settings file 200a in a shared directory that is located in the internal path name "/fs3/rdb" obtained through the translation.

After writing the directory settings file 200a in the shared directory, the file sharing server program 301 enters an internal path name "/fs3/rdb/nas.conf" for the written directory settings file 200a and activates the directory settings management program 300.

Using the internal path name "/fs3/rdb/nas.conf" for the written directory settings file 200a, the directory settings management program 300 loads the settings information described in the directory settings file 200a onto the memory 170.

The directory settings management program 300 next activates the table management program 305 to refer to the storage characteristics information management table 500. The directory settings management program 300 judges whether or not the settings information described in the directory settings file 200a coincides with the current settings information of the shared directory in which the directory settings file 200a has just been written.

Specifically, the directory settings management program 300 chooses from among entries registered in the storage characteristics information management table 500 one whose internal path name 502 matches "/fs3" in the internal path name "/fs3/rdb" of the shared directory where the directory settings file 200a is written. The directory settings management program 300 judges whether or not information registered as the RAID type 504 and the hard disk drive device performance 505 in the chosen entry matches the settings information described in the directory settings file 200a.

Settings information described in the directory settings file 200a and the current settings information of the shared directory where the directory settings file 200a is written are not judged as a match when even one of information registered as the RAID type 504 and information registered as the hard disk drive device performance 505 does not match the settings information described in the directory settings file 200a. When information registered as the RAID type 504 and information registered as the hard disk drive device performance 505 both match the settings information described in the directory settings file 200a, settings information described in the directory settings file 200a and the current settings information of the shared directory where the directory settings file 200a is written are judged as a match.

In this example, an entry of the storage characteristics information management table 500 that has "/fs3" in the internal path name "/fs3/rdb" of the shared directory where the directory settings file 200a is written has RAID1 as the RAID type 504 and "intermediate" as the hard disk drive device performance 505.

On the other hand, the settings information described in the directory settings file 200a has RAID5 for the raidtype and "intermediate" for the diskspec. While the hard disk drive device performance of the shared directory where the directory settings file 200a is written matches the diskspec described in the directory settings file 200a, the RAID type of the shared directory where the directory settings file 200a is written does not mach the raidtype described in the directory settings file 200a.

It is therefore judged in this example that settings information described in the directory settings file 200a does not match the current settings information of the shared directory where the directory settings file 200a is written.

Next, the directory settings management program 300 activates the table management program 305 to have the table management program 305 search the storage characteristics information management table 500a for an entry that has "5"

as the RAID type 504 and "intermediate" as the hard disk drive device performance 505.

In this example, the entry that has "5" as the RAID type 504 and "intermediate" as the hard disk drive device performance 505 is one whose volume ID 503 is "vol5". The table management program 305 chooses, as a migration destination candidate, this entry's file server device name 501, internal path name 502, and volume ID 503, which are "nas1", "- - ", and "vol5", respectively. The table management program 305 sends the obtained migration destination candidate to the directory settings management program 300.

Receiving the migration destination candidate, the directory settings management table 300 judges whether or not the shared directory where the directory settings file 200a is written and whose internal path name is "/fs3/rdb" is the uppermost directory in a volume 401a where this shared directory is located and whose volume ID is "vol3", in order to judge whether volume-basis data migration is possible or not.

In this example, the volume 401a identified by the volume ID "vol3" only has data in the directory that has the internal path name "/fs3/rdb" and its underlying directories. It is therefore judged that the shared directory that has the internal path name "/fs3/rdb" is the uppermost directory in the volume 401a identified by the volume ID "vol3".

When the shared directory that has the internal path name "/fs3/rdb" is judged as the uppermost directory in the volume 401a identified by the volume ID "vol3", the directory settings management program 300 judges whether a volume 401b, which is identified by the volume ID "vol5" and which is a migration destination candidate, is an unused volume 401 or not. Since the volume 401b, which is identified by the volume ID "vol5" and which is a migration destination candidate, has " " as the internal path name 502 in this example, the migration destination candidate volume 401b identified by the volume ID "vol5" is judged as an unused volume 401.

The directory settings management program 300 next judges whether or not the migration destination candidate volume 401b identified by the volume ID "vol5" is in the disk array device 120 connected to the file server device 110 where this directory settings management program 300 is being executed and whose server device name is "nas1", in order to judge whether data migration between different file server devices 110 is unnecessary or not.

In this example, the migration destination candidate volume 401b identified by the volume ID "vol5" has "nas 1" as the file server device name 501, and it is therefore judged that the migration destination candidate volume 401b identified by the volume ID "vol5" is in the disk array device 120 connected to the file server device 110 where this directory settings management program 300 is being executed and whose server device name is "nas1".

Then, in order to change the current settings information of the shared directory storing the directory settings file 200a to the settings information described in the directory settings file 200a, the directory settings management program 300 migrates, on a volume basis, data in the volume 401a where the shared directory storing the directory settings file 200a is located to the volume 401b, which matches the settings information described in the directory settings file 200a.

The directory settings management program 300 activates the disk array device control program 321 stored in the disk array device 120 to migrate data in the volume 401a identified by the volume ID "vol3" to the volume 401b identified by the volume ID "vol5".

Once the disk array device control program 321 migrates data in the volume 401a identified by the volume ID "vol3" to the volume 401b identified by the volume ID "vol5", the shared directory in which the directory settings file 200a is written is now located in the volume 401b identified by the volume ID "vol5".

The directory settings management program 300 then activates the file server device settings management program 304 to change the shared directory address settings information management table 510.

Specifically, the file server device settings management program 304 picks up an entry, from the shared directory address settings information management table 510, that has "/rdb" as the shared directory address path name 511, and changes the internal path name 512 of this entry from "/fs3/rdb" to "/fs5/rdb". An internal path name "/fs5" is the internal path name of the volume 401b to which the shared directory migrates. The volume 401b may have any other internal path name than "/fs5" as long as it is a valid path name.

After the disk array device control program 321 finishes migrating data in the volume 401a identified by the volume ID "vol3" to the volume 401b identified by the volume ID "vol5", the volume 401a identified by the volume ID "vol3" becomes a volume 401 that is out of use whereas the volume 401b identified by the volume ID "vol5" becomes a volume that is in use. The directory settings management program 300 activates the table management program 305 to change the storage characteristics information management table 500 accordingly.

Specifically, the table management program 305 picks up an entry, from the storage characteristics information management table 500, that has "vol3" as the volume ID 503, and changes the internal path name 502 of this entry to "- -". The table management program 305 also picks up an entry, from the storage characteristics information management table 500, that has "vol5" as the volume ID 503, and changes the internal path name 502 of this entry to "/fs5".

In this way, data in the shared directory whose internal path name 502 is "/rdb" is migrated from the volume 401a which is RAID1 to the volume 401b which is RAID5. The user 1 can thus access the shared directory relocated to the volume 401b by specifying the same shared directory address as the one that has been used prior to the settings change.

Details of the directory settings management program 300 will be described next with reference to FIGS. 13 to 18.

Figure 13:
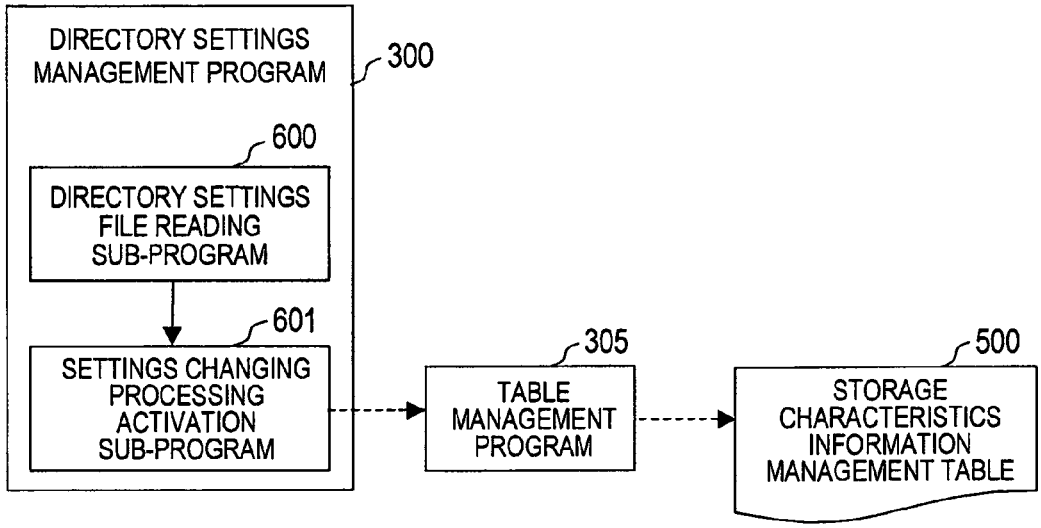
FIG. 13 is a diagram illustrating processing of updating the storage characteristics information management table according to the embodiment of this invention.

FIG. 13 is a diagram illustrating processing of updating the storage characteristics information management table 500 according to the embodiment of this invention.

The directory settings management program 300 contains a directory settings file reading sub-program 600 and a settings changing processing activation sub-program 601.

The directory settings file reading sub-program 600 loads onto the memory 170 shared directory settings information that is described in the directory settings file 200 stored in a shared directory. The directory settings file 200 loaded onto the memory 170 is located in an internal path name obtained through translation by the file sharing server program 301.

The settings changing processing activation sub-program 601 executes settings changing processing for a device and a program that need a settings change according to the directory settings file 200 loaded onto the memory 170.

The settings changing processing activation sub-program 601 refers to the storage characteristics information management table 500 to judge whether or not settings described in the directory settings file 200 coincide with the current shared directory settings.

Judging that settings described in the directory settings file 200 do not match the current shared directory settings, the settings changing processing activation sub-program 601 chooses a device and a program that are necessary to make the current shared directory settings consistent with the settings described in the read directory settings file 200, and performs settings changing processing on the chosen device and program.

The settings changing processing activation sub-program 601 does not execute settings changing processing when it is judged that settings described in the directory settings file 200 match the current shared directory settings.

The settings changing processing activation sub-program 601 has the table management program 305 search the storage characteristics information management table 500 for the name and internal path name of the file server device 110 that provides a shared directory whose settings match those described in the read directory settings file 200.

The settings changing processing activation sub-program 601 thus chooses a device and a program that are necessary to make the current shared directory settings consistent with settings described in the read directory settings file 200.

In the case where settings information in the directory settings file 200 that is entered upon activation of the settings changing processing activation sub-program 601 indicates execution of maintenance operation, the settings changing processing activation sub-program 601 skips the step of judging whether or not settings described in the directory settings file 200 match the current shared directory settings, and immediately executes settings changing processing.

After executing setting changing processing, the settings changing processing activation sub-program 601 has the table management program 305 change the storage characteristics information management table 500 according to the storage characteristics information changed through the settings changing processing.

Figure 14:
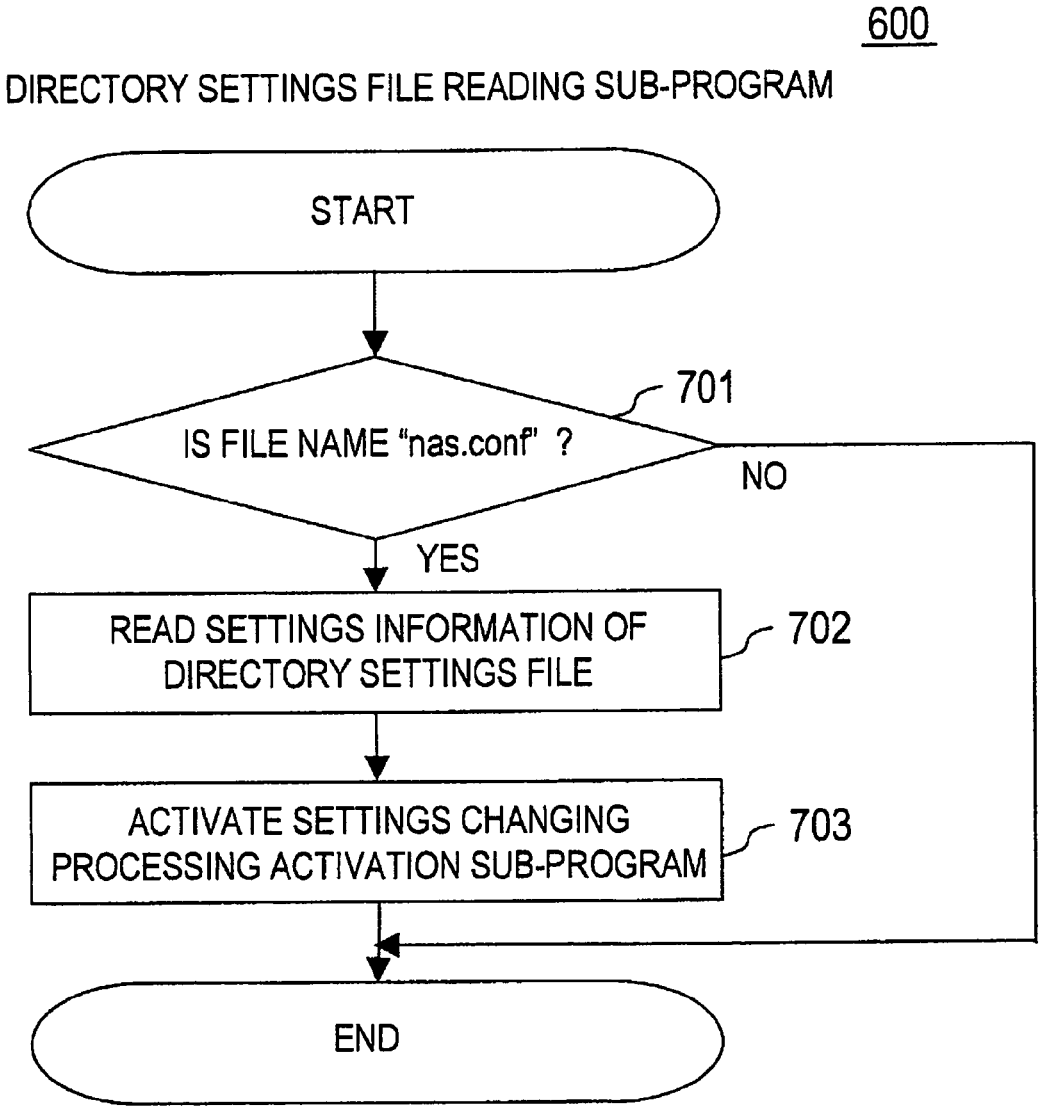
FIG. 14 is a flow chart of a directory settings file reading sub-program according to the embodiment of this invention.

FIG. 14 is a flow chart of the directory settings file reading sub-program 600 according to the embodiment of this invention.

The directory settings file reading sub-program 600 judges whether a file stored in a shared directory is the directory settings file 200 or not (Step 701). Specifically, the directory settings file reading sub-program 600 judges whether the name of a file stored in a shared directory is "nas.conf" or not.

The directory settings file reading sub-program 600 terminates the processing when it is judged that the file stored in the shared directory is not the directory settings file 200.

When the file stored in the shared directory is judged as the directory settings file 200, the directory settings file reading sub-program 600 loads onto the memory 170 settings information that the directory settings file 200 stored in the shared directory describes (Step 702).

The directory settings file reading sub-program 600 then activates the settings changing processing activation sub-program 601 (Step 703), and ends the processing.

Figure 15:
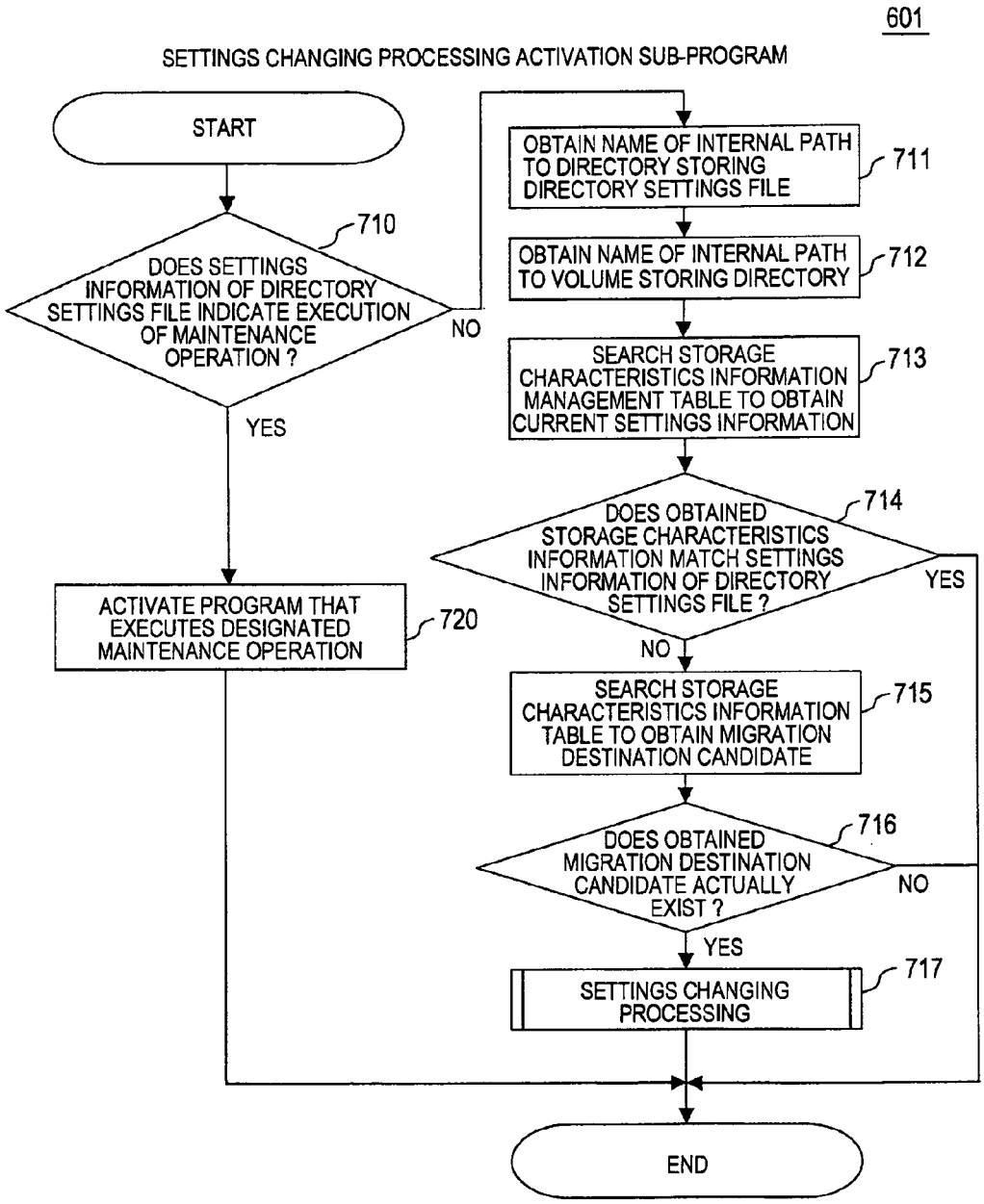
FIG. 15 is a flow chart of a settings changing processing activation sub-program according to the embodiment of this invention.

FIG. 15 is a flow chart of the settings changing processing activation sub-program 601 according to the embodiment of this invention.

The settings changing processing activation sub-program 601 first judges whether or not settings information described in the read directory settings file 200 indicates execution of maintenance operation (Step 710).

Judging that the settings information described in the read directory settings file 200 indicates execution of maintenance operation, the settings changing processing activation sub-program 601 activates a program that executes the maintenance operation specified by the directory settings file 200 (Step 720), and terminates the processing.

Judging that the settings information described in the read directory settings file 200 does not indicate execution of maintenance operation, the settings changing processing activation sub-program 601 obtains the name of an internal path to a shared directory storing the directory settings file 200 (Step 711). In other words, the settings changing processing activation sub-program 601 obtains the internal path name of a shared directory on which settings changing processing is to be performed.

The settings changing processing activation sub-program 601 next obtains, from the internal path name of the shared directory storing the directory settings file 200 that has been obtained through the processing of Step 711, the name of an internal path to the volume 401 storing the directory settings file 200 (Step 712).

The settings changing processing activation sub-program 601 has the table management program 305 retrieve from the storage characteristics information management table 500 characteristics information of the volume 401 whose internal path name has been obtained through the processing of Step 712 (Step 713).

Specifically, the table management program 305 picks up an entry from the storage characteristics information management table 500 whose internal path name 502 matches the internal path name of the volume 401 that has been obtained through the processing of Step 712, and extracts information registered as the RAID type 504 and the hard disk drive device performance 505 from this entry. The table management program 305 sends the extracted information of the RAID type 504 and the hard disk drive device performance 505 to the settings changing processing activation sub-program 601 as characteristics information of the volume 401 that contains the shared directory storing the directory settings file 200.

The settings changing processing activation sub-program 601 next judges whether or not settings information described in the directory settings file 200 coincides with settings information of the shared directory storing the directory settings file 200 (Step 714).

When the settings information described in the directory settings file 200 and the settings information of the shared directory storing the directory settings file 200 are judged as a match, there is no need to execute settings changing processing. The settings changing processing activation sub-program 601 accordingly terminates the processing.

When it is judged that the settings information described in the directory settings file 200 does not coincide with the settings information of the shared directory storing the directory settings file 200, the settings changing processing activation sub-program 601 has the table management program 305 search the storage characteristics information management table 500 for a migration destination candidate, which is the volume 401 whose settings information matches the settings described in the directory settings file 200 (Step 715).

Specifically, the table management program 305 picks up an entry from the storage characteristics information management table 500 whose RAID type 504 and hard disk drive device performance 505 match the raidtype information and diskspec information described in the directory settings file 200, respectively. The settings changing processing activation sub-program 601 extracts from this entry the file server device name 501, the internal path name 502, and the volume ID 503, which respectively indicate an identifier assigned to the file server device 110, the name of an internal path to the volume 401, and an identifier assigned to the volume 401. The table management program 305 sends the extracted information as a migration destination candidate to the settings changing processing activation sub-program 601.

The settings changing processing activation sub-program 601 judges whether or not the migration destination candidate obtained through the processing of Step 715 actually exists (Step 716).

When it is judged that the migration destination candidate obtained through the processing of Step 715 does not exist, the settings of the shared directory storing the directory settings file 200 cannot be changed. The settings changing processing activation sub-program 601 therefore terminates the processing.

When it is judged that the migration destination candidate obtained through the processing of Step 715 actually exists, the settings changing processing activation sub-program 601 executes settings changing processing with the path name of the shared directory whose settings are to be changed and the migration destination candidate as arguments (Step 717), and then ends the processing. The settings changing processing will be described in detail with reference to FIG. 16.

Figure 16:
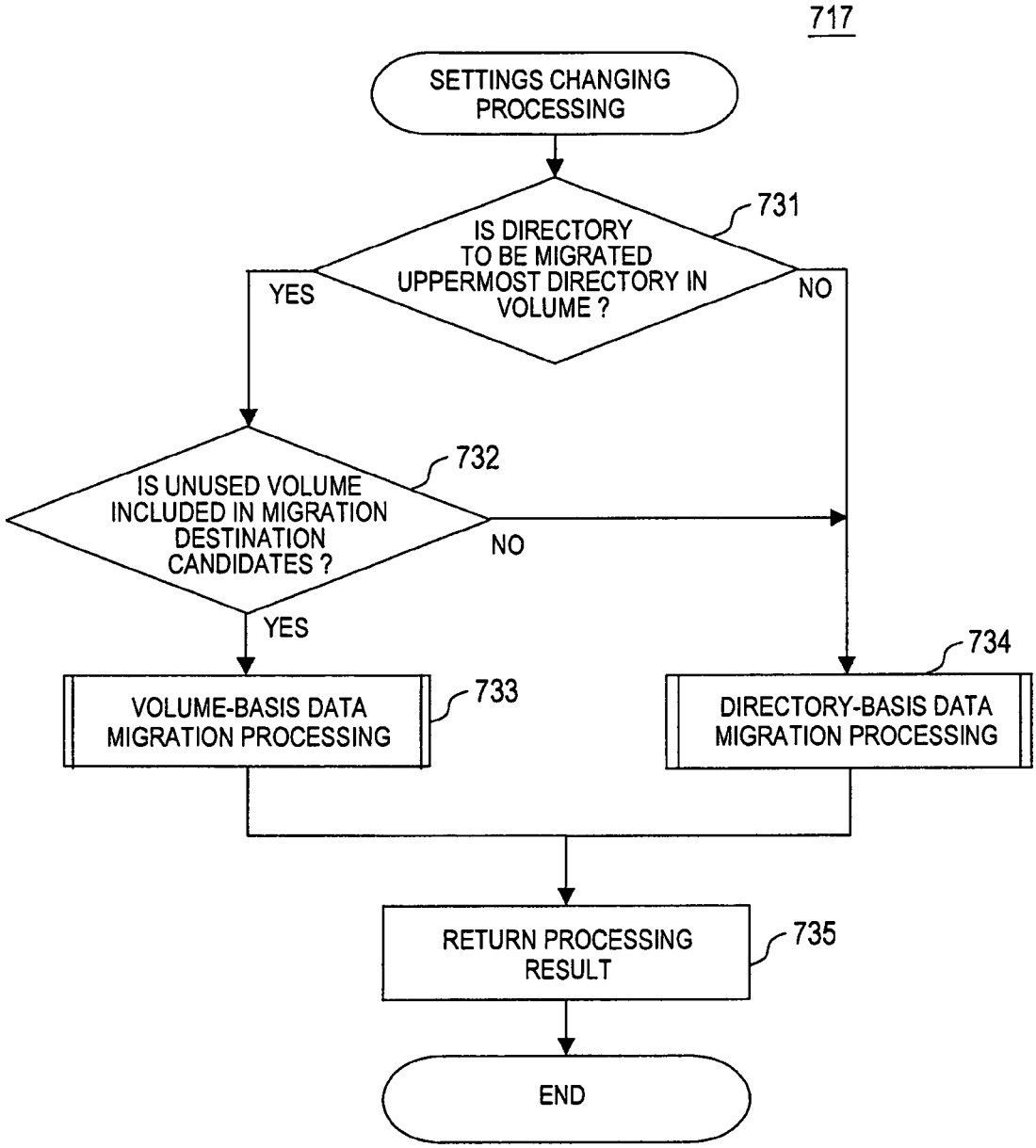
FIG. 16 is a flow chart for settings changing processing 717 which is executed by the settings changing processing activation sub-program according to the embodiment of this invention.

FIG. 16 is a flow chart of the setting changing processing 717 executed by the settings changing processing activation sub-program 601 according to the embodiment of this invention.

The settings changing processing activation sub-program 601 judges whether or not the shared directory whose settings are to be changed is the uppermost directory in the volume 401 where this shared directory is located (Step 731).

When it is judged in the processing of Step 731 that the shared directory whose settings are to be changed is not the uppermost directory in the volume 401 where this shared directory is located, it means that the volume 401 has other directories in the same layer as the shared directory whose settings are to be changed.

Then the settings changing processing activation sub-program 601 cannot migrate, on a volume 401 basis, data stored in the volume 401 that contains the shared directory whose settings are to be changed to the volume 401 that matches the settings information described in the directory settings file 200. The settings changing processing activation sub-program 601 accordingly migrates the data on a directory basis (Step 734). The processing of Step 734 will be described in detail with reference to FIG. 18.

When it is judged in the processing of Step 731 that the shared directory whose settings are to be changed is the uppermost directory in the volume 401 where this shared directory is located, the settings changing processing activation sub-program 601 judges whether or not any volume 401 chosen as a migration destination candidate through the processing of Step 715 is an unused volume (Step 732).

Specifically, the settings changing processing activation sub-program 601 judges whether or not information extracted as a migration destination candidate through the processing of Step 715 contains an internal path name "- -".

When it is judged in the processing of Step 732 that no volume 401 chosen as a migration destination candidate is an unused volume, the settings changing processing activation sub-program 601 migrates on to processing of Step 734.

When it is judged in the processing of Step 732 that at least one volume 401 chosen as a migration destination candidate is an unused volume, the settings changing processing activation sub-program 601 performs volume-basis migration in which the volume 401 containing the shared directory whose settings are to be changed is migrated to the migration destination candidate volume 401 (Step 733). The processing of Step 733 will be described in detail with reference to FIG. 17.

The settings information of the shared directory storing the directory settings file 200 is thus changed to the settings information described in the directory settings file 200.

The settings changing processing activation sub-program 601 then returns the changed settings of the shared directory storing the directory settings file 200 (Step 735).

Figure 17:
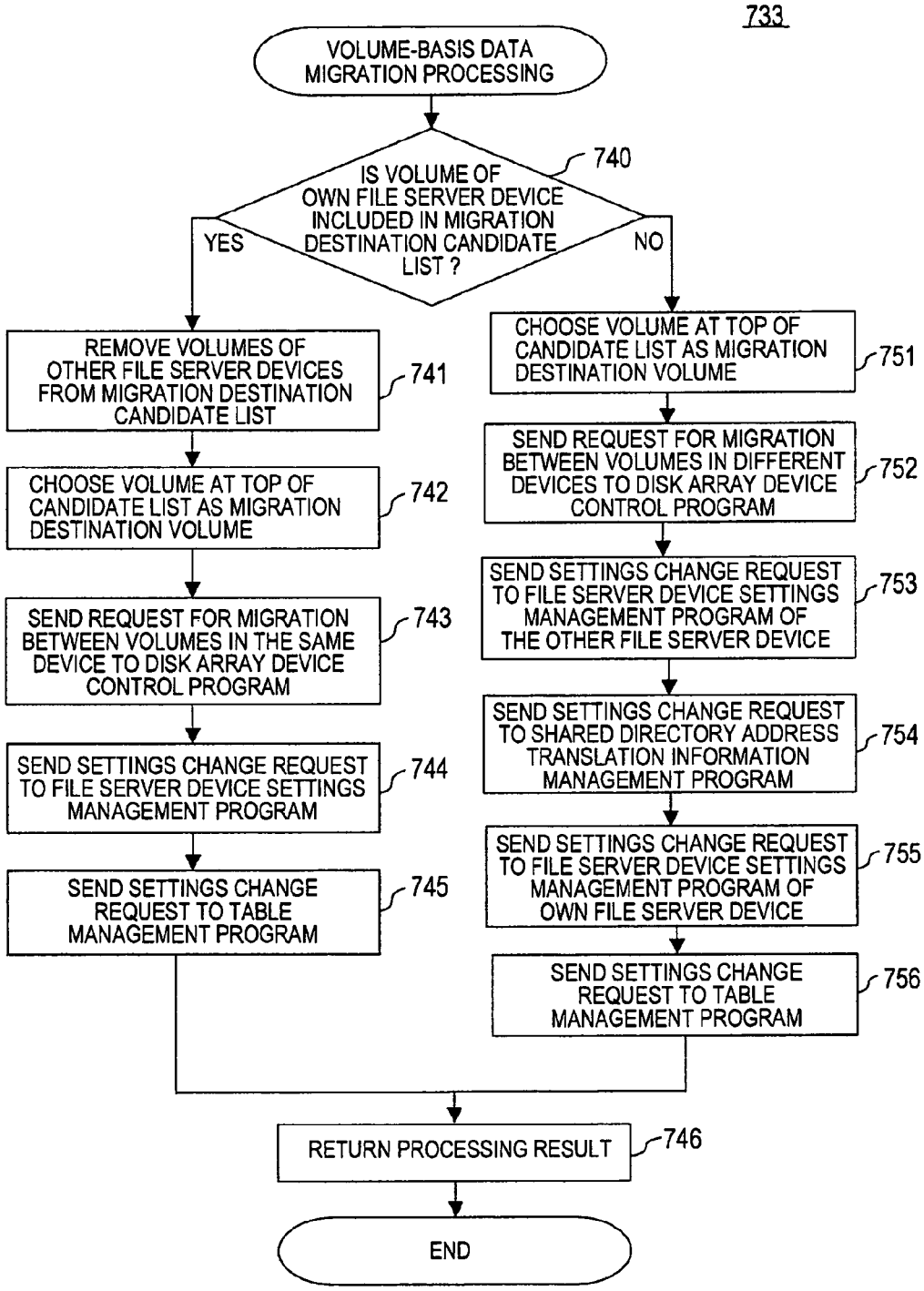
FIG. 17 is a flow chart for volume-basis data migration processing which is executed by the settings changing processing activation sub-program according to the embodiment of this invention.

FIG. 17 is a flow chart of the volume-basis data migration processing 733 executed by the settings changing processing activation sub-program 601 according to the embodiment of this invention.

The settings changing processing activation sub-program 601 judges whether or not any volume 401 chosen as a migration destination candidate through the processing of Step 715 belongs to the file server device 110 that is executing this settings changing processing activation sub-program 601 (Step 740).

Specifically, the settings changing processing activation sub-program 601 judges whether or not information extracted as a migration destination candidate through the processing of Step 715 contains the name of the file server device 110 that is executing this settings changing processing activation sub-program 601.

When it is judged that no volume 401 chosen as a migration destination candidate through the processing of S715 belongs to the file server device 110 where this settings changing processing activation sub-program 601 is run, the settings changing processing activation sub-program 601 executes the processing of Step 751 to Step 756. The processing of Step 751 to Step 756 will be described in detail in a modification example of this embodiment.

When it is judged that at least one volume 401 chosen as a migration destination candidate through the processing of S715 belongs to the file server device 110 where this settings changing processing activation sub-program 601 is run, the settings changing processing activation sub-program 601 executes processing of Step S741 to Step 745. The processing of Step 741 to Step 745 corresponds to the one described in FIGS. 11 and 12.

The settings changing processing activation sub-program 601 removes, from the migration destination candidate entries, any entry that does not have the name of the file server device 110 running this settings changing processing activation sub-program 601 as the file server device name 501 (Step 741).

From the remaining migration destination candidate entries, the settings changing processing activation sub-program 601 selects entries that hold identifiers assigned to the volumes 401 that are not in use. The settings changing processing activation sub-program 601 chooses, as a migration destination volume, the volume 401 identified by a volume identifier that is held by the top entry among the selected entries (Step 742).

Instead of the volume 401 that is indicated by the top migration destination candidate entry, the settings changing processing activation sub-program 601 may choose as a migration destination volume the volume 401 whose capacity is the largest, yet the closest to the capacity of the migration source volume 401 in the candidate volumes 401.

Alternatively, the settings changing processing activation sub-program 601 may choose as a migration destination volume the volume 401 constituted of the hard disk drive device 400 that belongs to the same array group as the hard disk drive device 400 constituting the migration source volume 401.

In the case where the load characteristics of the respective volumes 401 are under monitoring, the choice of migration destination volume may be made based on the load characteristics of the volumes 401.

The settings changing processing activation sub-program 601 next sends a request to migrate information stored in every directory in the migration source volume 401 to the chosen migration destination volume 401 to the disk array device control program 321 in the disk array device 120 connected to the file server device 110 (Step 743).

The settings changing processing activation sub-program 601 sends a request to update the shared directory address settings information management table 510 to the file server device settings management program 304 (Step 744).

Receiving the request to update the shared directory address settings information management table 510 from the settings changing processing activation sub-program 601, the file server device settings management program 304 chooses an entry, from the shared directory address settings information management table 510, whose shared directory address path name 511 matches the path name of the directory that has been migrated from the migration source volume 401 to the chosen migration destination volume 401.

The file server device settings management program 304 extracts the internal path name of the volume 401 from an internal path name registered as the internal path name 512 in the chosen entry, and changes the extracted volume internal path name to the internal path name of the volume 401 chosen as the migration destination volume.

The settings changing processing activation sub-program 601 next sends a request to update the storage characteristics information management table 500 to the table management program 305 (Step 745).

Receiving the request to update the storage characteristics information management table 500, the table management program 305 chooses an entry, from the storage characteristics information management table 500, whose volume ID 503 matches the identifier of the migration source volume 401.

The table management program 305 changes a path name currently registered as the internal path name 502 in the chosen entry to "- -".

The table management program 305 also chooses from the storage characteristics information management table 500 an entry whose volume ID 503 matches the identifier of the volume 401 chosen as the migration destination volume.

The table management program 305 changes "- -", which is currently registered as the internal path name 502 in the chosen entry, to the internal path name of the migration destination volume.

The settings changing processing activation sub-program 601 returns the changed settings of the shared directory storing the directory settings file 200 (Step 746).

Figure 18:
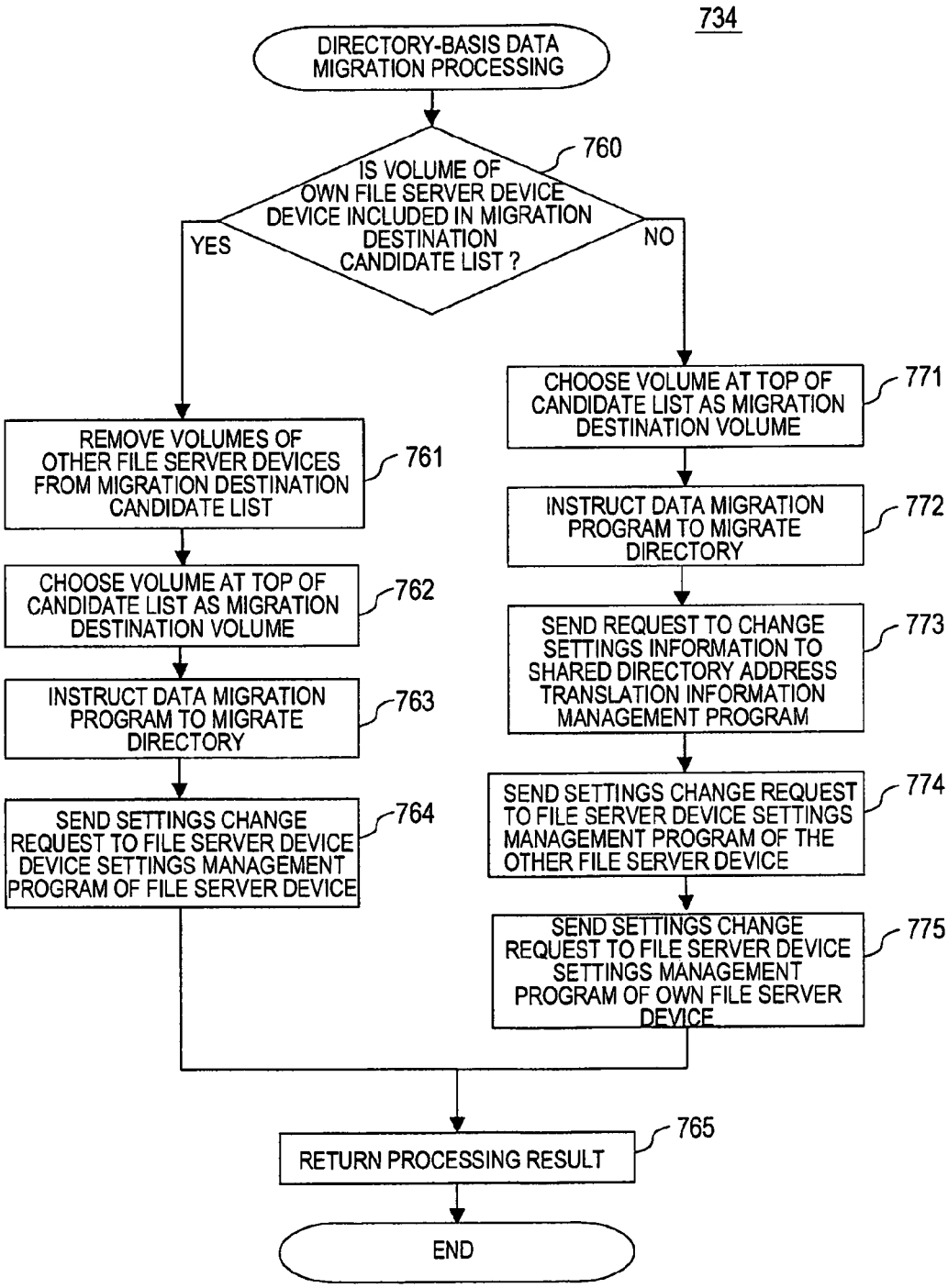
FIG. 18 is a flow chart for directory-basis data migration processing which is executed by the settings changing processing activation sub-program according to the embodiment of this invention.

FIG. 18 is a flow chart of the directory-basis data migration processing 734 executed by the settings changing processing activation sub-program 601 according to the embodiment of this invention.

The settings changing processing activation sub-program 601 first judges whether or not any volume 401 chosen as a migration destination candidate through the processing of Step 715 belongs to the file server device 110 that is executing this settings changing processing activation sub-program 601 (Step 760). The processing of Step 760 is the same as the processing of Step 740, and a specific description thereof will be omitted.

When it is judged that no volume 401 chosen as a migration destination candidate through the processing of S715 belongs to the file server device 110 where this settings changing processing activation sub-program 601 is run, the settings changing processing activation sub-program 601 executes the processing of Step 771 to Step 775. The processing of Step 771 to Step 775 will be described in a modification example of this embodiment. The processing of Step 771 to Step 775 will be described with reference to FIGS. 19 and 20.

When it is judged that at least one volume 401 chosen as a migration destination candidate through the processing of S715 belongs to the file server device 110 where this settings changing processing activation sub-program 601 is run, the settings changing processing activation sub-program 601 executes processing of Step S761 to Step 764.

The settings changing processing activation sub-program 601 removes, from the migration destination candidate entries, any entry that does not have the name of the file server device 110 running this settings changing processing activation sub-program 601 as the file server device name 501 (Step 761).

The settings changing processing activation sub-program 601 chooses, as a migration destination volume, the volume 401 identified by a volume identifier that is held by the top entry among the selected entries (Step 762). In the case where the volume 401 chosen as the migration destination volume is an unused volume, this volume is formatted.

As in the processing of Step 742, the settings changing processing activation sub-program 601 may choose as a migration destination volume the volume 401 whose capacity is the largest than the capacity of the volume 401 out of which the shared directory is migrated and closer thereto than to any other candidate volumes 401, instead of the volume 401 that is indicated by the top migration destination candidate entry.

Alternatively, the settings changing processing activation sub-program 601 may choose as a migration destination volume the volume 401 constituted of the hard disk drive device 400 that belongs to the same array group as the hard disk drive device 400 constituting the volume 401 out of which the shared directory is migrated.

In the case where the load characteristics of the respective volumes 401 are under monitoring, the choice of migration destination volume may be made based on the load characteristics of the volumes 401.

The settings changing processing activation sub-program 601 next sends a request to migrate the shared directory storing the directory settings file 200 to the volume 401 chosen as the migration destination volume to the file migration program 303 (Step 763).

The settings changing processing activation sub-program 601 sends a request to change settings in the shared directory address settings information management table 510 to the file server device settings management program 304 (Step 764).

Receiving the request to change settings in the shared directory address settings information management table 510 from the settings changing processing activation sub-program 601, the file server device settings management program 304 chooses an entry from the shared directory address settings information management table 510 whose shared directory address path name 511 matches the path name of the shared directory to be relocated.

The file server device settings management program 304 extracts the internal path name of the volume 401 from an internal path name registered as the internal path name 512 in the chosen entry, and changes the extracted volume internal path name to the internal path name of the volume 401 chosen as the migration destination volume.

The settings changing processing activation sub-program 601 returns the changed settings of the shared directory storing the directory settings file 200 (Step 765).

A modification example of this embodiment will be described next.

In the modification example of this embodiment, the shared directory address translation table 530 stored in the GNS server device 130 is changed when settings information of a shared directory is changed.

A description will be given with reference to FIGS. 19 and 20 on processing of changing shared directory settings information as a result of migration of information from a shared directory of one file server device 110 to the volume 401 in the disk array device 120 connected to another file server device 110.

Figure 19:
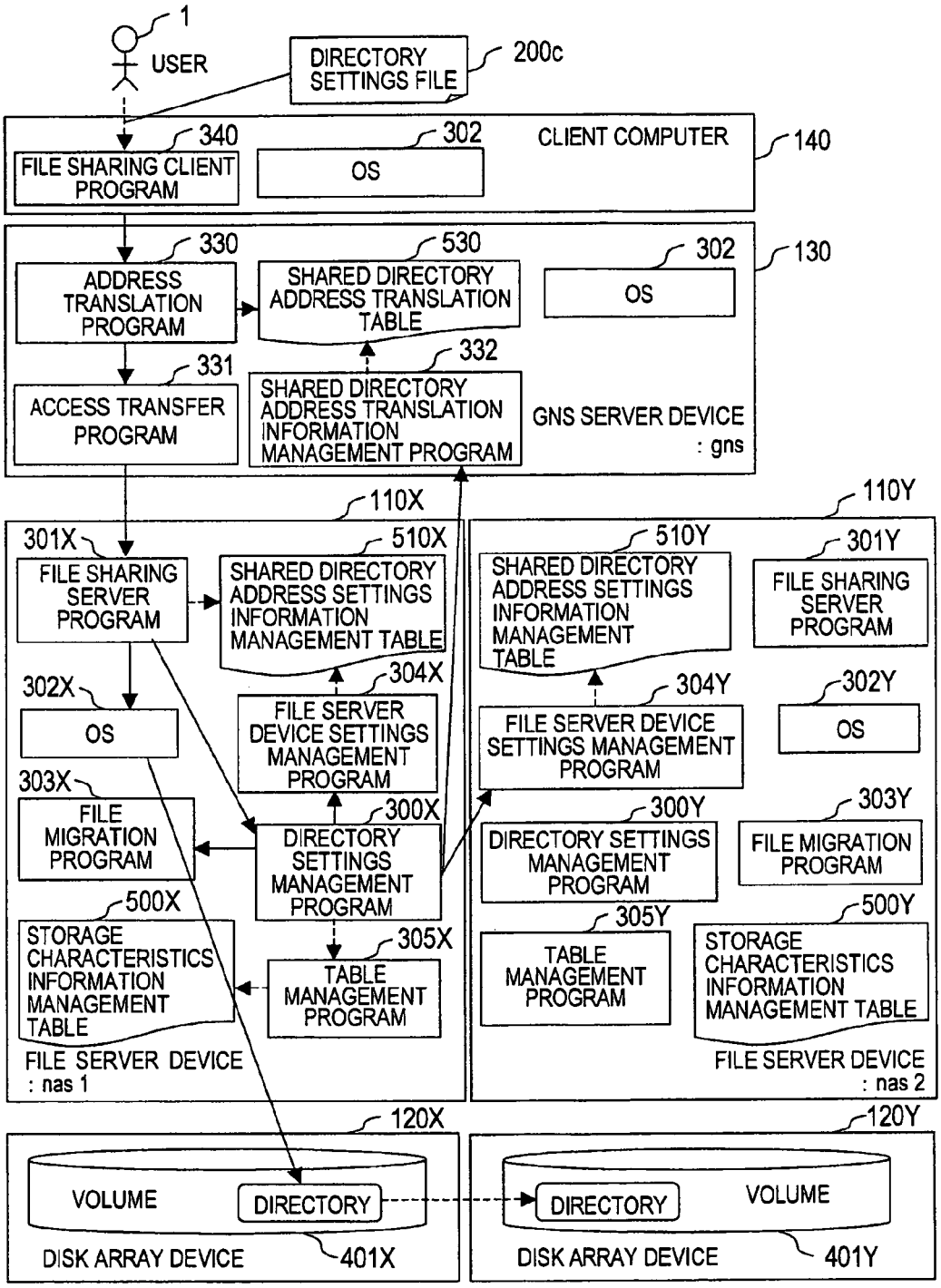
FIG. 19 is a sequence diagram for processing of changing shared directory settings information by moving information from a shared directory to a volume in a disk array device that is connected to another file server device according to a modification example of the embodiment of this invention.

FIG. 19 is a sequence diagram for processing of changing shared directory settings information by migrating information from a shared directory of one file server device 110 to the volume 401 in the disk array device 120 that is connected to another file server device 110 according to the modification example of this embodiment.

FIG. 20 is a describing respective tables before and after changing shared directory settings information by migrating information from a shared directory of one file server device 110 to the volume 401 in the disk array device 120 that is connected to another file server device 110 according to the modification example of this embodiment.

The description given here with reference to FIG. 19 omits any mention of hardware, and a mention of programs run by disk array devices 120X and 120Y that do not participate in the processing of changing shared directory settings information as a result of migration of information from a shared directory of one file server device 110 to the volume 401 in the disk array device 120 connected to another file server device 110.

A file server device 110X is the file server device 110 that provides a migration source shared directory, and a file server device 110Y is the file server device 110 that provides a migration destination shared directory.

A directory settings management program 300X, a file sharing server program 301X, an OS 302X, a file migration program 303X, a file server device settings management program 304X, and a table management program 305X are programs run by the file server device 110X, which provides the migration source shared directory.

A storage characteristics information management table 500X and a shared directory address settings information management table 510X are tables loaded onto the memory 170 that is in the file server device 110X, which provides the migration source shared directory.

A directory settings management program 300Y, a file sharing server program 301Y, an OS 302Y, a file migration program 303Y, a file server device settings management program 304Y, and a table management program 305Y are programs run by the file server device 110Y, which provides the migration destination shared directory.

A storage characteristics information management table 500Y and a shared directory address settings information management table 510Y are tables loaded onto the memory 170 that is in the file server device 110Y, which provides the migration destination shared directory.

A directory settings file 200c shown in FIG. 20 is described in the same format as the directory settings file 200 shown in FIG. 3. The directory settings file 200c describes a settings change to change the raidtype to "1" and the diskspec to "high".

A storage characteristics information management table 500c shown in FIG. 20 has the same format as the storage characteristics information management table 500 shown in FIG. 10. The storage characteristics information management table 500c is the storage characteristics information management table 500 before shared directory settings information is changed. Shared directory address settings information management tables 510Xc, 510Xd, 510Yc, and 510Yd shown in FIG. 20 have the same format as the shared directory address settings information management table 510 shown in FIG. 9.

The shared directory address settings information management table 510Xc is the shared directory address settings information management table 510 that is loaded onto the memory 170 in the file server device 110X, which provides the migration source shared directory, before shared directory address settings information is changed. The shared directory address settings information management table 510Xd is the shared directory address settings information management table 510 that is loaded onto the memory 170 in the file server device 110X, which provides the migration source shared directory, after shared directory address settings information is changed.

The shared directory address settings information management table 510Yc is the shared directory address settings information management table 510 that is loaded onto the memory 170 in the file server device 110Y, which provides the migration destination shared directory, before shared directory address settings information is changed. The shared directory address settings information management table 510Yd is the shared directory address settings information management table 510 that is loaded onto the memory 170 in the file server device 110Y, which provides the migration destination shared directory, after shared directory address settings information is changed.

The directory settings file 200c is a request to change settings of a shared directory located at a shared directory address "nas1:/rdb" such that the RAID type is RAID1 and the hard disk drive device performance is "high".

In FIGS. 19 and 20, a volume that matches settings information described in the directory settings file 200c is found outside of the file server device 110X, namely, in the file server device 110Y, and shared directory in which the directory settings file 200c is written is not the uppermost directory in a volume 401X of the file server device 110X. The shared directory in which the directory settings file 200c is written is therefore migrated from the volume 401X to a volume 401Y on a directory basis.

The directory settings file 200c is described by the user 1 operating the client computer 140. The user 1 designates "gns:/rdb/index" as the shared directory address of the shared directory in which the directory settings file 200c is written.

The file sharing client program 340 sends a request to write the directory settings file 200c to the GNS server device 130 that has a server device name "gns".

Receiving the request to write the directory settings file 200c, the GNS server device 130 activates the shared directory address translation program 330. The shared directory address translation program 330 refers to the shared directory address translation table 530, and translates the logical shared directory address path name "/rdb/index" into a physical shared directory address "nas1:/rdb/index".

Specifically, the shared directory address translation program 330 chooses from among entries registered in the shared directory address translation table 530 one whose logical shared directory address path name 531 matches "/rdb" in the logical shared directory address path name contained in the received request to write the directory settings file 200c. The shared directory address translation program 330 then translates the logical shared directory address path name "/rdb/index" contained in the received shared directory writing request into a physical shared directory address "nas1:/rdb/index" registered as the physical shared directory address 532 in the chosen entry.

The request to write the directory settings file 200c is then forwarded by the access transfer program 331 to the file server device 110X, which has a server device name "nas1".

Receiving the request to write the directory settings file 200c, the file server device 110X activates the file sharing server program 301X.

The file sharing server program 301X refers to the shared directory address settings information management table 510X, and translates the physical shared directory address path name "/rdb/index" into an internal path name "/fs3/rdb/index". A specific description on the translation has been given above with reference to FIG. 11, and will not be repeated here.

The file sharing server program 301X then uses the function of the OS 302X to write the directory settings file 200c in a shared directory that is located in the internal path name "/fs3/rdb/index" obtained through the translation.

After writing the directory settings file 200c in the shared directory, the file sharing server program 301X enters an internal path name "/fs3/rdb/index/nas.conf" for the written directory settings file 200c and activates the directory settings management program 300X.

Based on the internal path name "/fs3/rdb/index/nas.conf" for the written directory settings file 200c, the directory settings management program 300X loads the settings information described in the directory settings file 200c onto the memory 170.

The directory settings management program 300X next activates the table management program 305X to refer to the storage characteristics information management table 500X. The directory settings management program 300X judges whether or not the settings information described in the directory settings file 200c coincides with the current settings information of the shared directory in which the directory settings file 200c has just been written. A specific description on the judging process has been given above with reference to FIG. 11, and will not be repeated here.

In this example, an entry of the storage characteristics information management table 500X that has "/fs3" in the internal path name "/fs3/rdb/index" of the shared directory where the directory settings file 200c is written has RAID1 as the RAID type 504 and "intermediate" as the hard disk drive device performance 505.

On the other hand, the settings information described in the directory settings file 200c has RAID1 for the raidtype and "high" for the diskspec. While the RAID type of the shared directory where the directory settings file 200c is written matches the raidtype described in the directory settings file 200c, the hard disk drive device performance of the shared directory where the directory settings file 200c is written does not match the diskspec described in the directory settings file 200c.

It is therefore judged in this example that settings information described in the directory settings file 200c does not match the current settings information of the shared directory where the directory settings file 200c is written.

Next, the directory settings management program 300X activates the table management program 305X to have the table management program 305X search the storage characteristics information management table 500X for a volume 401 which matches the settings information described in the directory settings file 200c.

In this example, the entry that has "1" as the RAID type 504 and "high" as the hard disk drive device performance 505 is one whose volume ID 503 is "vol7". The table management program 305X chooses, as a migration destination candidate, this entry's file server device name 501, internal path name 502, and volume ID 503, which are "nas2", "/fs7", and "vol7", respectively. The table management program 305X sends the obtained migration destination candidate to the directory settings management program 300X.

Receiving the migration destination candidate, the directory settings management table 300X judges whether or not the shared directory where the directory settings file 200c is written and whose internal path name is "/fs3/rdb/index" is the uppermost directory in the volume 401X where this shared directory is located and whose volume ID is "vol3", in order to judge whether volume-basis data migration is possible or not.

In this example, the volume 401X identified by the volume ID "vol3" has a directory that has an internal path name "/fs3/rdb" as a directory upstream of the directory that has the internal path name "/fs3/rdb/index". It is therefore judged that the directory that has the internal path name "/fs3/rdb/index" is not the uppermost directory in the volume 401X identified by the volume ID "vol3".

Accordingly, the settings information of the shared directory in which the directory settings file 200c is written is changed through directory-basis data migration.

The directory settings management program 300X next judges whether or not the migration destination candidate volume 401Y identified by the volume ID "vol7" is in a disk array device 120X connected to the file server device 110X where this directory settings management program 300X is being executed and whose server device name is "nas1", in order to judge whether data migration between different file server devices 110 is unnecessary or not.

In this example, the migration destination candidate volume 401Y identified by the volume ID "vol7" has "nas2" as the file server device name 501, and it is therefore judged that the migration destination candidate volume 401Y identified by the volume ID "vol7" is not in the disk array device 120X connected to the file server device 110X where this directory settings management program 300X is being executed and whose server device name is "nas1".

Then, in order to change the current settings information of the shared directory where the directory settings file 200c is written to the settings information described in the directory settings file 200c, the directory settings management program 300X performs directory-basis migration and migrates the shared directory where the directory settings file 200c is written from the file server device 110X, which is identified by the server device name "nas1", to the file server device 110Y, which is identified by the server device name "nas2".

The directory settings management program 300X activates the file migration program 303X to migrate the shared directory where the directory settings file 200c is written to the volume 401Y identified by the volume ID "vol7". The path name "/fs3/rdb/index" of the shared directory in which the directory settings file 200c is written and the path name "nas2:/fs3" of the migration destination volume 401Y are entered in the file migration program 303X.

Once the shared directory where the directory settings file 200c is written is migrated to the volume 401Y identified by the volume ID "vol7", the internal path name of the shared directory in which the directory settings file 200c is written is changed from "/fs3/rdb/index" to "fs7/rdb/index".

The directory settings management program 300X accordingly activates the file server device settings management program 304Y in the file server device 110Y to add the association relation between the shared directory address path name "/rdb/index" and the internal path name "fs7/rdb/index" to the shared directory address settings information management table 510Yc.

After the shared directory where the directory settings file 200c is written is migrated to the volume 401Y identified by the volume ID "vol7", the physical shared directory address of the shared directory in which the directory settings file 200c is written is changed from "nas1:/rdb/index" to "nas2:/rdb/index".

The directory settings management program 300X accordingly activates the shared directory address translation information management program 332 in the GNS server device 130 to add the association relation between the logical shared directory address path name "/rdb/index" and the physical shared directory address "nas2:/rdb/index" to a shared directory address translation table 530c.

The shared directory address translation table 530 after the shared directory migration is a shared directory address translation table 530d shown in FIG. 20. The shared directory address settings information management table 510 that is stored in the file server device 110X after the relocation of the shared directory is the shared directory address settings information management table 510Xd shown in FIG. 20. The shared directory address settings information management table 510 that is stored in the file server device 110Y after the migration of the shared directory is the shared directory address settings information management table 510Yd shown in FIG. 20.

In this way, the shared directory is migrated from the volume 401X whose hard disk drive device performance is "intermediate" to the volume 401Y whose hard disk drive device performance is "high". The shared directory address translation table 530 and the shared directory address settings information management table 510 that need a settings change are set to post-shared directory migration settings after the migration of the shared directory is finished. The user 1 can thus access the shared directory migrated to the volume 401Y by specifying the same shared directory address that has been used prior to the settings change.

Described next are the flow charts of FIGS. 17 and 18 which illustrate a case in which the shared directory address translation table 530 stored in the GNS server device 130 is changed after a settings change of a shared directory where the directory settings file 200 is written. A description on the same processing as the one in the above-mentioned embodiment will be omitted here.

The shared directory address translation table 530 stored in the GNS server device 130 is changed when a shared directory in which the directory settings file 200 is written is migrated from the file server device 110 that provides this shared directory where the directory settings file 200 is written to another file server device 110.

The processing of Step 751 to Step 756 in FIG. 17 will be described first.

The settings changing processing activation sub-program 601 executes the processing of Step 751 when it is judged in the processing of Step 740 that no volume 401 chosen as a migration destination candidate through the processing of Step 715 belongs to the file server device 110 that is running this settings changing processing activation sub-program 601. The processing of Step 751 is the same as the processing of Step 742, and the description will not be repeated.

The settings changing processing activation sub-program 601 sends, to the disk array device control program 321 in the disk array device 120 that contains the volume 401 chosen through the processing of Step 751 as the migration destination volume, a request to migrate information stored in every directory in the migration source volume 401 to the chosen migration destination volume 401 (Step 752).

After the disk array device control program 321 finishes migrating information that is stored in every directory in the migration source volume 401 to the volume 401 chosen as the migration destination volume, the settings changing processing activation sub-program 601 causes the file server device 110 that is connected to the disk array device 120 containing the chosen migration destination volume 401 (hereinafter referred to as migration destination file server device 110) to activate the file server device settings management program 304.

The settings changing processing activation sub-program 601 sends, to the activated file server device settings management program 304, a request to update the shared directory address settings information management table 510 loaded onto the memory 170 in the migration destination file server device 110 (Step 753). For details of this processing, see the description given above on the processing of Step 744.

The settings changing processing activation sub-program 601 then has the GNS server device 130 activate the shared directory address translation information management program 332.

The settings changing processing activation sub-program 601 sends a request to update the shared directory address translation table 530 to the activated shared directory address translation information management program 332 (Step 754).

Specifically, the shared directory address translation information management program 332 chooses, from among entries registered in the shared directory address translation table 530, one whose logical shared directory address path name 531 matches a part of the internal path name of a shared directory in the chosen migration destination volume 401 that remains after a path name indicating the volume 401 is removed.

The shared directory address translation information management program 332 extracts a server device name from a physical shared directory address contained in the chosen entry, and changes the extracted server device name to a server device name that indicates the migration destination file server device 110.

The settings changing processing activation sub-program 601 next causes the file server device 110 that is connected to the disk array device 120 containing the migration source volume 401 (hereinafter referred to as migration source file server device 110) to activate the file server device settings management program 304.

The settings changing processing activation sub-program 601 sends a request to update the shared directory address translation table 530 to the activated file server device settings management program 304 (Step 755). For details of this processing, see the description given above on the processing of Step 744.

The settings changing processing activation sub-program 601 next causes the migration source file server device 110 and the migration destination file server device 110 to activate their respective table management programs 305.

The settings changing processing activation sub-program 601 sends a request to update the storage characteristics information management table 500 to each activated table management program 305 (Step 756). For details of this processing, see the description given above on the processing of Step 745.

Processing of Step 771 to Step 775 in the flow chart of FIG. 18 will be described next.

The settings changing processing activation sub-program 601 executes the processing of Step 771 when it is judged in the processing of Step 760 that no volume 401 chosen through the processing of Step 715 as a migration destination candidate belongs to the file server device 110 that is running this settings changing processing activation sub-program 601.

The processing of Step 771 is the same as the processing of Step 762, and the description will not be repeated.

The settings changing processing activation sub-program 601 then causes the migration source file server device 110 to activate the file migration program 303. The settings changing processing activation sub-program 601 sends, to the activated file migration program 303, a request to migrate the shared directory where the directory settings file 200 is stored to the volume 401 chosen as the migration destination volume (Step 772).

The settings changing processing activation sub-program 601 then causes the GNS server device 130 to activate the shared directory address translation information management program 332.

The settings changing processing activation sub-program 601 sends a request to update the shared directory address translation table 530 to the activated shared directory address translation information management program 332 (Step 773). For details of this processing, see the description given above on the processing of Step 754.

The settings changing processing activation sub-program 601 then causes the migration destination file server device 110 to activate the file server device settings management program 304.

The settings changing processing activation sub-program 601 sends, to the activated file server device settings management program 304, a request to update the shared directory address settings information management table 510 loaded onto the memory 170 in the migration destination file server device 110 (Step 774). For details of this processing, see the description given above on the processing of Step 744.

The settings changing processing activation sub-program 601 then causes the migration source file server device 110 to activate the file server device settings management program 304.

The settings changing processing activation sub-program 601 sends, to the activated file server device settings management program 304, a request to update the shared directory address translation table 530 (Step 775). For details of this processing, see the description given above on the processing of Step 744.

Described next are application examples of this invention.

A first application example relates to operation of setting the same settings to different shared directories.

According to this application example, the user 1 who wishes to set the same settings to different shared directories writes, in one shared directory, the directory settings file 200 that describes settings information to be set. The user 1 then makes copies of the directory settings file 200 written in this shared directory, and writes the copies of the directory settings file 200 in shared directories that are to have the same settings as this shared directory. In this way, multiple shared directories are simultaneously changed to have the same storage characteristics.

The user 1 does not need to include in the directory settings file 200 an explicit description about which shared directory is to be set, but a shared directory in which the directory settings file 200 is automatically deemed as a shared directory to be set. This enables the user 1 to set the same settings to different shared directories by simply making copies of the directory settings file 200 and writing the copies in shared directories that the user 1 wishes to have the same settings.

A second application example relates to operation of setting directories concurrently with installation of software.

Software installation and directory setting are executed separately in the prior art. This application example makes simultaneous software installation and directory setting possible.

Specifically, an installer program contained in software to be installed creates directories for storing programs, data files, and others that are necessary to execute the software, and also writes the directory settings file 200 of this application example in the created directories.

When the installer program creates a directory and writes the directory settings file 200 in the created directory, directory settings changing processing is executed. This makes it possible to, for example, set a directory that stores a program and a directory that stores data to their respective optimum storage characteristics.

A third application example relates to operation of changing, upon addition of a new file server device 110 to the computer system, shared directory settings to settings information described in the directory settings file 200 that has already been written in a shared directory.

In some cases, a shared directory in which the directory settings file 200 is written is left unchanged from the former settings information instead of being set to settings information described in the directory settings file 200.

For that reason, when a new file server device 110 is added to the computer system, the directory settings file 200 that has already been written in a shared directory is read and shared directory settings changing processing is executed again to make the settings of this shared directory consistent with settings information described in the directory settings file 200.

According to this application example, shared directory settings changing processing is executed again when a new file server device 110 is added subsequently. In this way, in some cases, settings information of a shared directory that has failed to be changed to settings information described in the directory settings file 200 prior to an addition of a new file server device 110 can be set to the settings information described in the directory settings file 200. A specific procedure of the operation will be described below.

When the shared directory settings changing processing is executed, the directory settings management program 300 first determines whether to execute shared directory settings changing processing. When execution of shared directory settings changing processing is not going to make settings information of a shared directory consistent with settings information described in the directory settings file 200, the directory settings management program 300 terminates the processing without executing the shared directory settings changing processing.

Upon addition of a new file server device 110 to the computer system, the directory settings management program 300 refers to storage characteristics information of a volume in the disk array device 120 that is connected to the added file server device 110.

The directory settings management program 300 judges whether or not the storage characteristics information of the added volume matches the settings information described in the directory settings file 200.

Judging that the storage characteristics information of the added volume matches the settings information described in the directory settings file 200, the directory settings management program 300 changes settings of a shared directory in which this directory settings file 200 has been written.

An administrator of the computer system operates the file sharing server program 301 to activate the directory settings management program 300 and to cause the directory settings management program 300 to process the directory settings file 200 stored in the shared directory that is provided by the existing file server device 110.

The directory settings management program 300 executes the same settings changing processing as the one that is executed in case that the directory settings file 200 is written. The settings changing processing as requested by the user 1 is completed in a case where the settings information described in the directory settings file 200 does not match the current settings information of the shared directory and in a case where the addition of the new file server device 110 creates a volume that matches the settings information described in the directory settings file 200.

According to this application example, the user 1 can change shared directory settings information without writing in the directory settings file 200 the shared directory address of a shared directory whose settings information is to be changed. Setting wrong settings information in a shared directory can thus be prevented.

This application example also enables the user 1 to reuse settings information described in the directory settings file 200 that is stored in one directory by writing the directory settings file 200 in another directory. Further, in a computer system that has the GNS server device 130, the user 1 can change shared directory settings information without the knowledge of what physical shared directory address the file server device 110 has.

While the present invention has been described in detail and pictorially in the accompanying drawings, the present invention is not limited to such detail but covers various obvious modifications and equivalent arrangements, which fall within the purview of the appended claims.

What is claimed is:

1. A method for changing settings information of a shared directory in a computer system comprising at least one file server device, a client computer and a storage system, the settings information of the shared directory provided by the file server device, the file server device being accessible from the client computer, the storage system being accessible from the file server device, the client computer having a first processor, which performs computation processing, a first storage unit, which is coupled to the first processor, and a first interface, which is coupled to the first processor, the file server device having a second processor, which performs computation processing, a second storage unit, which is coupled to the second processor, and a second interface, which is coupled to the second processor, the storage system having a third processor, which performs computation processing, a third interface, which is coupled to the third processor, and a third storage unit in which at least one volume including a storage area, the method comprising:

sending, by the first processor, a write request to the file server device via the first interface and the second interface in order to request to write, in the shared directory whose settings information is to be changed, a directory settings file that describes new settings information for this shared directory;

storing, in the second storage unit storage characteristics information in which settings information of the volume is registered;

providing, by the second processor, the client computer with a shared directory which is included in at least one volume included in the third storage unit;

writing, by the second processor, in case of receiving the request to write the directory settings file via the first interface and the second interface, the directory settings file in the shared directory according to the received directory settings file writing request;

referring, by the second processor, to the storage characteristics information to select, as data migration destination candidate, at least one volume whose settings information matches the new settings information described in the directory settings file;

obtaining, by the second processor, information for identifying the selected volume; and executing, by the second processor, settings changing processing of migrating information from the shared directory in which the directory settings file is written to one of the selected volume, executing, by the second processor, in a case where the shared directory in which the directory settings file is written is an uppermost directory in the volume in which this shared directory is included, where the directory settings file is written, volume-basis migrating processing of migrating, on a volume basis, information from the volume in which the shared directory is included, where the directory settings file is written to one of the migration destination candidate volume that is not in use; and executing, by the second processor, in a case where the shared directory in which the directory settings file is written is not the uppermost directory in the volume in which this shared directory is included where the directory settings file is written, directory-basis migration processing of migrating, on a directory basis, information from the shared directory where the directory settings file is written to one of the migration destination candidate volume, and wherein the computer system further includes an address translation computer accessible from the client computer, wherein the address translation computer has a fourth processor, which performs computation processing, a fourth storage unit, which is coupled to the fourth processor, and a fourth interface, which is coupled to the fourth processor, and wherein the address translation computer can access the file server device via the second interface and the fourth interface, the method further comprising:

storing, in the fourth storage unit, shared directory address translation information to register an association relation between a path name for the shared directory and a name of the file server device that provides the shared directory;

sending, by the first processor, a request to write the directory settings file in the shared directory to the address translation computer via the first interface and the fourth interface;

referring, by the fourth processor, in case of receiving the write request via the first interface and the fourth interface, to the shared directory address translation information to identify which file server device provides a shared directory that is identified by a path name designated in the received write request; and forwarding, by the fourth processor, the received write request to the identified file server device via the second interface and the fourth interface.

2. The method of changing settings information of a shared directory according to claim 1, further comprising:

executing, by the second processor, the settings changing processing after referring to the storage characteristics information in a case where the new shared directory settings information described in the directory settings file does not match the settings information of the shared directory in which the directory settings file is written.

3. The method of changing settings information of a shared directory according to claim 1, further comprising:

additionally storing, in the second storage unit, address settings information to register an association relation between a path name for the shared directory and information for identifying the volume where the shared directory is included;

executing, by the second processor, the volume-basis migration processing in the file server device that provides the shared directory where the directory settings file is written;

updating, by the second processor, the address settings information such that a path name for the migrated shared directory is associated with information for identifying the volume where the migrated shared directory is included; and updating, by the second processor, the storage characteristics information with settings information of the volume where the migrated shared directory is included.

4. The method of changing settings information of a shared directory according to claim 1, further comprising:

additionally storing, in the second storage unit, address settings information to register an association relation between a path name for the shared directory and information for identifying the volume where the shared directory is included;

executing, by the second processor, the volume-basis migration processing in the file server device that provides the shared directory where the directory settings file is written; and updating, by the second processor, the address settings information such that a path name for the migrated shared directory is associated with information for identifying the volume where the migrated shared directory is included.

5. The method of changing settings information of a shared directory according to claim 3, wherein the file server device includes a first file server device and a second file server device, and wherein the storage system includes a first storage system, which is accessible from the first file server device, and a second storage system, which is accessible from the second file server device, the method further comprising:

sending, by the first processor, the write request to the first file server device via the first interface and the second interface which the first file server device has;

storing, in the second storage unit which the first file server device has and the second storage unit which the second file server device has, address settings information to register an association relation between a path name for the shared directory and information for identifying the volume where the shared directory is included;

executing, by the second processor of the first file server device, the volume-basis migration processing for data migration between the first file server device and the second file server device in case where the write request is received via the first interface and the second interface which the first file server device has and in case where information for identifying the migration destination candidate volume does not contain information for identifying a volume that is included in the third storage unit of the first storage system;

updating, by the second processor of the first file server device, the address settings information that is stored in the second storage unit of the second file server device such that a path name for the migrated shared directory is associated with information for identifying a volume that contains the migrated shared directory;

updating, by the second processor of the first file server device, the shared directory address translation information stored in the fourth storage unit such that a path name for the migrated shared directory is associated with a name of the second file server device; and updating, by the second processor of the first file server device, the storage characteristics information that is stored in the second storage unit of the first file server device and in the second storage unit of the second tile server device with settings information of the volume where the migrated shared directory is included.

6. The method of changing settings information of a shared directory according to claim 3, wherein the file server device includes a first file server device and a second file server device, and wherein the storage system includes a first storage system, which is accessible from the first file server device, and a second storage system, which is accessible from the second file server device, the method further comprising:

sending, by the first processor, the write request to the first file server device via the first interface and the second interface which the first file server device is included;

storing, in the second storage unit which the first file server device has and the second storage unit which the second file server device has, address settings information to register an association relation between a path name for the shared directory and information for identifying the volume where the shared directory is included;

executing, by the second processor of the first file server device, the volume-basis migration processing for data migration between the first file server device and the second file server device in case where the write request is received via the first interface and the second interface which the first file server device has and in case where information for identifying the migration destination candidate volume does not contain information for identifying a volume that is included in the third storage unit of the first storage system;

updating, by the second processor of the first file server device, the address settings information that is stored in the second storage unit of the second file server device such that a path name for the migrated shared directory is associated with information for identifying a volume that contains the migrated shared directory; and updating, by the second processor of the first file server device, the shared directory address translation information stored in the fourth storage unit such that a path name for the migrated shared directory is associated with a name of the file server device that provides the migrated shared directory.

7. The method of changing settings information of a shared directory according to claim 1, wherein the second interface is coupled to the third interface via a storage area network.

8. The method of changing settings information of a shared directory according to claim 1, wherein the file server device and the storage system are installed in the same casing.

9. A file server device which is accessible from a client computer and accessible to a storage system, comprising:

a processor which performs computation processing;

a storage unit which is coupled to the processor; and an interface which is coupled to the processor, wherein the storage unit stores storage characteristics information to register settings information of at least one volume set in the storage system, wherein the processor provides the client computer with a shared directory, which is included in at least one volume included in the storage system accessible from the file server device, wherein, in case of receiving a request via the interface to write a directory settings file, the processor writes the directory settings file in a shared directory whose settings information is to be changed according to the received write request, the directory settings file describing new settings information for this shared directory whose settings information is to be changed, wherein the processor refers to the storage characteristics information in order to select, as data migration destination candidate, at least one volume whose settings information matches the new settings information described in the directory settings file, wherein the processor obtains information for identifying the selected volume, and wherein the processor executes settings changing processing of migrating information from the shared directory in which the directory settings file is written to one of the selected volume, wherein, in a case where the shared directory in which the directory settings file is written is an uppermost directory in the volume in which this shared directory is included, where the directory settings file is written, the processor executes volume-basis migration processing of migrating, on a volume basis, information from the volume in which the shared directory is included, where the directory settings file is written to one of the migration destination candidate volume that is not in use, and wherein, in a case where the shared directory in which the directory settings file is written is not the uppermost directory in the volume in which this shared directory is included where the directory settings file is written, the processor executes directory-basis migration processing of migrating, on a directory basis, information from the shared directory where the directory settings file is written to one of the migration destination candidate volume;

wherein the file server device is further coupled to a shared directory address translation computer, and wherein the shared directory address translation computer identifies, based on a path name designated in the write request, to which file server device the write request is to be sent, and the processor thus receives the write request via the interface.

10. The file server device according to claim 9, wherein the processor executes the settings changing processing after referring to the storage characteristics information in a case where the new shared directory settings information described in the directory settings file does not match the settings information of the shared directory in which the directory settings file is written.

11. The file server device according to claim 9, wherein the storage unit further stores address settings information to register an association relation between a path name for the shared directory and information for identifying the volume where the shared directory is included, wherein the processor executes the volume-basis migration processing in the file server device that provides the shared directory where the directory settings file is written, wherein the processor updates the address settings information such that a path name for the migrated shared directory is associated with information for identifying the volume where the migrated shared directory is included, and wherein the processor updates the storage characteristics information with settings information of the volume where the migrated shared directory is included.

12. The file server device according to claim 9, wherein the storage unit further stores address settings information to register an association relation between a path name for the shared directory and information for identifying the volume where the shared directory is included, wherein the processor executes the directory-basis migration processing in the file server device that provides the shared directory where the directory settings file is written, and wherein the processor updates the address settings information such that a path name for the migrated shared directory is associated with information for identifying the volume where the migrated shared directory is included.

13. The file server device according to claim 11, wherein the storage unit stores address settings information to register an association relation between a path name for the shared directory and information for identifying the volume where the shared directory is included, wherein the processor executes the volume-basis migration processing for data migration between the file server device that is the receiver of the write request and another file server device in case where the write request is received via the interface and in case where information for identifying the migration destination candidate volume does not contain information for identifying a volume included in the storage system that has access to the file server device that is the receiver of the write request, wherein the processor updates the address settings information that is stored in a storage unit of the other file server device to which the shared directory is migrated such that a path name for the migrated shared directory is associated with information for identifying a volume where the migrated shared directory is included, wherein the processor notifies an address translation computer of the association relation between the path name for the migrated shared directory and the information for identifying the file server device which has access to the storage system where volume is included, in which the migrated shared directory is included, and wherein the processor updates the storage characteristics information stored in the storage unit with settings information of the volume where the migrated shared directory is included.

14. The file server device according to claim 11, wherein the storage unit stores address settings information to register an association relation between a path name for the shared directory and information for identifying the volume where the shared directory is included, wherein the processor executes the volume-basis migration processing for data migration between the file server device that is the receiver of the write request and another file server device, in case where the write request is received via the interface and in case where information for identifying the migration destination candidate volume does not contain information for identifying a volume included in the storage system that has access to the file server device that is the receiver of the write request, wherein the processor updates the address settings information that is stored in a storage unit of the other file server device to which the shared directory is migrated such that a path name for the migrated shared directory is associated with information for identifying a volume where the migrated shared directory is included, and wherein the processor notifies an address translation computer of the association relation between the path name for the migrated shared directory and the information for identifying the file server device which has access to the storage system where volume is included, in which the migrated shared directory is included.

15. The file server device according to claim 9, wherein the interface is coupled to the storage system via a storage area network.

16. The file server device according to claim 9, wherein the file server device and the storage system are installed in the same casing.

* * * * *

UNITED STATES PATENT AND TRADEMARK OFFICE

CERTIFICATE OF CORRECTION

PATENT NO. : RE42,859 E
APPLICATION NO. : 12/662439
DATED : October 18, 2011
INVENTOR(S) : Tomida et al.

It is certified that error appears in the above-identified patent and that said Letters Patent is hereby corrected as shown below:

On the Title Page:

Item [64], Replace sub-heading, PCT Filed: with sub-heading, Filed.

Signed and Sealed this
First Day of November, 2011

David J. Kappos

David J. Kappos
*Director of the United States Patent and Trademark Office*